(12) United States Patent
Pileeki

(10) Patent No.: US 8,567,270 B1
(45) Date of Patent: Oct. 29, 2013

(54) INFINITELY VARIABLE RECIPROCATING TRANSMISSION APPARATUS

(76) Inventor: Stephen E. Pileeki, Phoenix, AZ (US)

( * ) Notice: Subject to any disclaimer, the term of this patent is extended or adjusted under 35 U.S.C. 154(b) by 382 days.

(21) Appl. No.: 13/004,163

(22) Filed: Jan. 11, 2011

(51) Int. Cl.
  *F16H 21/22* (2006.01)
(52) U.S. Cl.
  USPC .................................................. 74/46; 74/45
(58) Field of Classification Search
  USPC ............................ 74/45–51, 65–68, 110–169;
  123/197.1–197.3
  See application file for complete search history.

(56) References Cited

U.S. PATENT DOCUMENTS

| | | | | |
|---|---|---|---|---|
| 1,769,614 | A | * | 7/1930 | Anglada ........................ 475/16 |
| 2,109,174 | A | * | 2/1938 | Kalko ............................. 74/119 |
| 2,416,739 | A | * | 3/1947 | Chandler ....................... 74/118 |
| 3,731,549 | A | | 5/1973 | Kaiser et al. |
| 4,411,165 | A | * | 10/1983 | Evans ............................. 74/63 |
| 4,428,740 | A | | 1/1984 | Moore |
| 4,475,412 | A | * | 10/1984 | Evans ............................ 74/119 |
| 4,487,085 | A | | 12/1984 | Collins |
| 4,515,026 | A | * | 5/1985 | Perkins ........................... 74/63 |
| 4,557,161 | A | | 12/1985 | DeSousa |
| 4,763,544 | A | | 8/1988 | Blakemore |
| 5,036,716 | A | | 8/1991 | Daniehl |
| 5,440,945 | A | * | 8/1995 | Penn ............................... 74/117 |
| 5,603,240 | A | * | 2/1997 | Klovstad et al. ............... 74/120 |
| 6,298,740 | B1 | | 10/2001 | Bridges |
| 6,758,111 | B2 | * | 7/2004 | Buonauro ....................... 74/119 |
| 2001/0001372 | A1 | | 5/2001 | Park |
| 2004/0089085 | A1 | | 5/2004 | Naude |
| 2008/0026903 | A1 | | 1/2008 | Flugrad et al. |
| 2010/0294054 | A1 | * | 11/2010 | Flugrad et al. ................... 74/50 |

* cited by examiner

*Primary Examiner* — Troy Chambers
*Assistant Examiner* — Valentin Craciun
(74) *Attorney, Agent, or Firm* — Parsons & Goltry; Michael W. Goltry; Robert A. Parsons

(57) ABSTRACT

A transmission includes an input coupled to reciprocate a lug along a stroke path. The lug is coupled between a shuttle and a persuader, the shuttle is coupled to drive an output in response to reciprocation of the shuttle along a drive path, and the persuader is coupled between the lug and the shuttle and is operable to change the stroke path between an inoperative direction relative to the drive path isolating the shuttle from the forcible reciprocation of the lug and an operative direction relative to the drive path transferring the forcible reciprocation of the lug along the stroke path to the shuttle imparting reciprocation to the shuttle along the drive path. Forcible reciprocation of the lug is transferred to the shuttle along an infinitely variable gearing range between the inoperative and operative directions of the stroke path of the lug relative to the drive path of the shuttle.

19 Claims, 21 Drawing Sheets

INFINITELY VARIABLE RECIPROCATING TRANSMISSION APPARATUS

FIELD OF THE INVENTION

The present invention relates to transmissions for transferring power from an input to an output along an infinitely variable torque and gearing ratio or range.

BACKGROUND OF THE INVENTION

A transmission is a device interposed between a source of power and a specific application for the purpose of adapting one to the other. Most mechanical transmissions function as rotary speed changers. The ratio of the output speed to the input speed may be constant, as in a gearbox, or variable. On variable-speed transmissions the speeds may be variable in discrete steps, as on an automobile or some machine-tool drives, or they may be continuously variable within a range. Step-variable transmissions, with some slip, usually employ either gears or chains and provide fixed speed ratios with no slip. Stepless transmissions use either belts, chains, or rolling-contact bodies.

A widely used and inexpensive stepless drive consists of a V-belt running on variable-diameter pulleys. The sides of the pulleys are conical on the inside to match the taper of the V-belt, and moving them closer together causes the V-belt to move outward from the center of the pulley and operate on a larger effective circle; this movement changes the speed ratio. Such drives depend on friction and are unfortunately subject to slip.

Stepless transmissions employing rolling-contact bodies are known as traction drives. In these transmissions, power is transmitted in a variety of ways that depend on the rolling friction of bodies in the form of cylinders, cones, balls, rollers, and disks.

A traction transmission consists of input and output members having toroidal surfaces connected by a series of adjustable rollers. For some applications, these transmissions are designed so that as the applied torque (turning moment) increases, the contact pressure between the bodies increases, so that slippage is reduced. A special traction lubricant that stiffens as the load is applied may be used to increase the tractive effort. Traction transmissions are used in applications where quietness is important.

Automatic transmissions are composed of an arrangement of gears, brakes, clutches, a fluid drive, and governing devices that automatically change the speed ratio between the engine and the wheels of an automobile. Since its introduction in 1939, the fully automatic transmission has become optional or standard equipment on most passenger cars. When the transmission is in the drive position, the driver has only to depress the accelerator pedal, and as the car gathers speed the transmission will shift automatically through its entire forward range of gears from low to high (ratios of the speeds of drive shaft and engine shaft) until the two shafts are directly connected through the oil in the fluid drive, which may be either a two-element fluid coupling or a three-element torque converter. When the car loses speed the transmission automatically shifts back from high to low gear.

A fluid coupling has two vaned turbines facing each other. As the engine-driven turbine turns, a torque is transmitted by churning oil that circulates between them. This is much like two fans facing each other; as the one is turned on and as its speed accelerates, the air flowing from it will cause the other fan to turn. In the automobile, the oil permits the fluid coupling to slip easily at low engine speeds thus also permitting idling while the brake is on. At high speeds, the slippage is almost eliminated, and the fluid coupling functions like a solid connection.

The hydraulic torque converter resembles the fluid coupling. Oil transmits power in both. At lower speeds the blades of a pump, or impeller, force oil against the blades of a stator. These blades deflect the oil against a turbine, therefore increasing torque. At higher speeds, as in the case of fluid coupling, the oil, stator, pump, and turbine turn together as a unit. The oil moves in different directions in different parts of a hydraulic torque converter. The pump spins and throws the oil outward. The doughnut-shaped housing that encloses the pump and turbine forces the oil toward the turbine. There it strikes the turbine blades and slides inward toward the turbine hub and then returns back through the stator. The stator is equipped with an overrunning, or one-way, clutch. This device permits the stator to be used for deflection of oil at low speeds and to move with the pump and turbine at high speeds. What is described here is the simplest system. Frequently the system has more elements to deflect and direct the oil, and often a torque converter is combined with gear transmissions. All shifting is done by a combination of planetary gears and a speed sensitive governing device that changes the position of valves that control the flow of hydraulic fluid.

The foregoing transmission apparatus are relatively complex, bulky and difficult and expensive to construct. In addition, it has been noticed that a substantial torque and power loss occurs in the aforementioned transmission apparatus during shifting from either a lower gear to a higher gear or a higher gear to a lower gear, and fluid leaks often occur which compromise operation. In addition, the torque converters or clutches used in combination with these transmissions need to be relatively large to accommodate 100% of the engine power flowing therethrough. These devices are inherently lossey, producing large amounts of heat. As a result, the cooling systems of most vehicles are constructed to be quite extensive for suppressing this heat build-up.

Furthermore, the fuel economy of motorized vehicles is directly dependent upon power and torque requirements. Usually, large amounts of power and torque can only be provided with large engines having a correspondingly high degree of fuel consumption. On the other hand, small economy cars compromise power and torque for achieving fuel economy, an aspect of small vehicles that is undesirable by most small car owners.

It would be highly advantageous, therefore, to remedy the foregoing and other deficiencies inherent in the prior art.

SUMMARY OF THE INVENTION

According to the principle of the invention, a transmission includes an input coupled to impart forcible reciprocation of a lug along a stroke path, the lug coupled between a shuttle and a persuader, the shuttle coupled to drive an output in response to reciprocation of the shuttle along a drive path, and the persuader coupled between the lug and the shuttle operable to change the stroke path relative to the drive path of the shuttle between an inoperative direction relative to the drive path isolating the shuttle from the forcible reciprocation of the lug and an operative direction relative to the drive path transferring the forcible reciprocation of the lug along the stroke path to the shuttle imparting reciprocation to the shuttle along the drive path, in which power from the input is transferred to the output along an infinitely variable torque and gearing range through the transfer of the forcible reciprocation of the lug to the shuttle between the inoperative and operative directions of the stroke path of the lug relative to the drive path of the shuttle. The inoperative direction of the stroke path is a transverse direction of the stroke path relative to the drive path of the shuttle. The operative direction of the stroke path is a parallel direction of the stroke path relative to the drive path of the shuttle. In the inoperative direction of the stroke path, the lug reciprocates along the stroke path relative to the shuttle and the persuader. In the operative direction of the stroke path, the lug reciprocates along the stroke path relative to the persuader and reciprocally acts against the shuttle reciprocating the shuttle along the drive path. Between the inoperative and operative directions of the stroke path of the lug, the lug reciprocates along the stroke path relative to the persuader, reciprocates along the stroke path partially relative to the shuttle, and partially reciprocally acts against the shuttle partially reciprocating the shuttle along the drive path. The reciprocation of the lug along the stroke path relative to the shuttle infinitely decreases from between the inoperative and operative directions of the stroke path, and infinitely increases from between the operative and inoperative directions of the stroke path. The reciprocation of the shuttle along the drive path in response to the reciprocal action of the lug against the shuttle infinitely increases from between the inoperative and operative directions of the stroke path, and infinitely decreases from between the operative and inoperative directions of the stroke path. The input is a crank shaft having a crank throw, and a linkage assembly operatively couples the crank throw of the crank shaft to the lug imparting the forcible reciprocation of the lug along the stroke path in response to rotation of the crank shaft. The output is a driven shaft, and the shuttle is operatively coupled to the driven shaft to drive the driven shaft for rotation in only one direction in response to reciprocation of the shuttle along the drive path. The shuttle is operatively coupled to the driven shaft to drive the driven shaft for rotation with a rack coupled to the shuttle geared to a clutched gear coupled to the driven shaft. The persuader is mounted for rotation between first and second positions to change the stroke path of the lug between the inoperative and operative directions, respectively. A persuader rotator is operatively coupled to the persuader to rotate the persuader between the first and second positions thereof in response to rotation of the persuader rotator. In a specific embodiment, the persuader rotator consists of a persuader shaft mounted for rotation, and the persuader shaft is operatively coupled to the persuader to rotate the persuader between the first and second positions thereof in response to rotation of the persuader shaft. The persuader shaft is operatively coupled to the persuader with gearing formed between the persuader shaft and the persuader, which consists of a pinion gear carried by the persuader shaft, and a corresponding partial gear carried by the persuader as part of the persuader, which may also be referred to as an arcuate rack gear.

According to the principle of the invention, a transmission includes a shuttle formed with a shuttle race and coupled to drive an output in response to reciprocation of the shuttle along a drive path. The shuttle race is transverse relative to the drive path. A persuader is formed with a persuader race, which opposes the shuttle race and defines a stroke path. A lug is reciprocated to the shuttle and persuader races. An input is coupled to impart forcible reciprocation of the lug along the stroke path of the persuader race. The persuader is movable to change the stroke path of the persuader race relative to the drive path of the shuttle between an inoperative direction relative to the drive path isolating the shuttle race from the forcible reciprocation of the lug along the stroke path and an operative direction relative to the drive path transferring the forcible reciprocation of the lug along the stroke path to the shuttle race imparting reciprocation to the shuttle along the drive path, in which power from the input is transferred to the output along an infinitely variable torque and gearing ratio or range through the transfer of the forcible reciprocation of the lug along the stroke path of the persuader race to the shuttle at the shuttle race between the inoperative and operative directions of the stroke path of the persuader race relative to the drive path of the shuttle. In the inoperative direction of the stroke path the lug reciprocates along the stroke path relative to the shuttle race and the persuader race. In the operative direction of the stroke path the lug reciprocates along the stroke path relative to the persuader race and reciprocally acts against the shuttle reciprocating the shuttle along the drive path. Between the inoperative and operative directions of the stroke path the lug reciprocates along the stroke path relative to the persuader, reciprocates along the stroke path partially relative to the shuttle, and partially reciprocally acts against the shuttle partially reciprocating the shuttle along the drive path. The reciprocation of the lug along the stroke path relative to the shuttle infinitely decreases from between the inoperative and operative directions of the stroke path, and infinitely increases from between the operative and inoperative directions of the stroke path. The reciprocation of the shuttle along the drive path in response to the reciprocal action of the lug against the shuttle race infinitely increases from between the inoperative and operative directions of the stroke path, and infinitely decreases from between the operative and inoperative directions of the stroke path of the lug. The inoperative direction of the stroke path is a transverse direction of the stroke path relative to the drive path of the shuttle. The operative direction of the stroke path is a parallel direction of the stroke path relative to the drive path of the shuttle. The input is a crank shaft having a crank throw, and a linkage assembly operatively couples the crank throw of the crank shaft to the lug imparting the forcible reciprocation of the lug along the stroke path in response to rotation of the crank shaft. The output is a driven shaft, and the shuttle is operatively coupled to the driven shaft to drive the driven shaft for rotation in only one direction in response to reciprocation of the shuttle along the drive path. The shuttle is operatively coupled to the driven shaft to drive the driven shaft for rotation with a rack coupled to the shuttle geared to a clutched gear coupled to the driven shaft. The persuader is mounted for rotation between first and second positions to change the stroke path between the inoperative and operative directions, respectively. A persuader rotator is operatively coupled to the persuader to rotate the persuader between the first and second positions thereof in response to rotation of the persuader rotator. In a specific embodiment, the persuader rotator consists of a persuader shaft is mounted for rotation, and the persuader shaft is operatively coupled to the persuader to rotate the persuader between the first and second positions thereof in response to rotation of the persuader shaft. The persuader shaft is operatively coupled to the persuader with gearing formed between the persuader shaft and the persuader, which consists of a pinion gear carried by the persuader shaft, and a corresponding partial gear carried by the persuader as part of the persuader, and this partial gear may also be referred to as an arcuate rack gear.

BRIEF DESCRIPTION OF THE DRAWINGS

Referring to the drawings.

DETAILED DESCRIPTION

Figure 1:
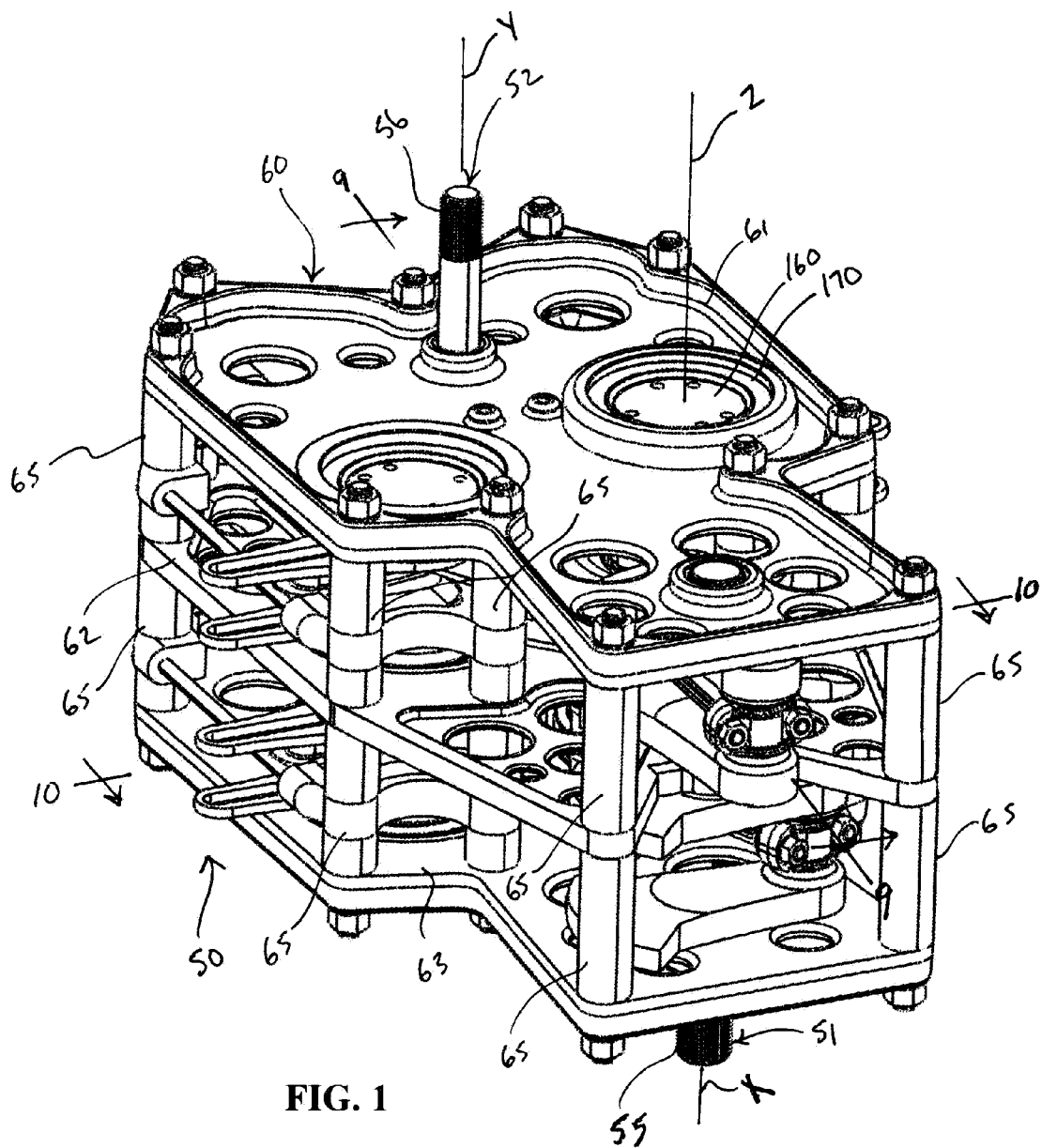
FIG. 1 is an isometric view of a transmission for transferring power from an input to an output, the transmission constructed and arranged in accordance with the principle of the invention.

Turning now to the drawings, in which like reference characters indicate corresponding elements throughout the several views, attention is first directed to FIG. 1 illustrating an isometric view of a transmission apparatus 50 for transferring power from a source of power or input 51 to a specific application or an output 52 along an infinitely variable torque and gearing ratio or range, in accordance with a preferred embodiment of the present invention. Transmission apparatus 50, and all the components thereof, is held and supported by a bridle assembly 60 consisting of parallel upper, intermediate, and lower bridle plates 61, 62 and 63, respectively, rigidly coupled with a series of spaced-apart threaded nut-and-bolt spacer assemblies 65. Most mechanical transmissions function as rotary speed changers, and transmission apparatus 50 is a rotary speed changer in the present embodiment. Input 51 is an input crankshaft 55 coupled to a power source (not shown), and output 52 is an output or driven shaft 56. Power supplied by crankshaft 55 from a power source is offered by rotational movement of crankshaft 55 about axis of rotation X, and rotational movement or speed of crankshaft 55 is transferred or imparted by transmission apparatus 50 to output shaft 56, which rotates about axis of rotation Y. The transfer of rotational speed from crankshaft 55 to output shaft 56 is operative for carrying out a specific application, for instance, driving a selected instrumentality such as a motor vehicle, a bicycle, a clothes washer, a conveyer or other apparatus. When used in combination with a motorized vehicle, such as a motorized vehicle, transmission apparatus 50 is operative for transferring power from the engine of the motor vehicle in the form of rotational movement to the wheels for rotating the wheels in a predetermined direction for propelling the motor vehicle in a predetermined direction and at a desired speed. From the ensuing discussion, it will be readily shown that transmission apparatus 50 offers a constantly and infinitely variable torque and gearing ratio or range for facilitating power transfer from input 51 to output 52. Bridle assembly 60 supports transmission apparatus 50 and is illustrated as a matter of example.

Figure 2:
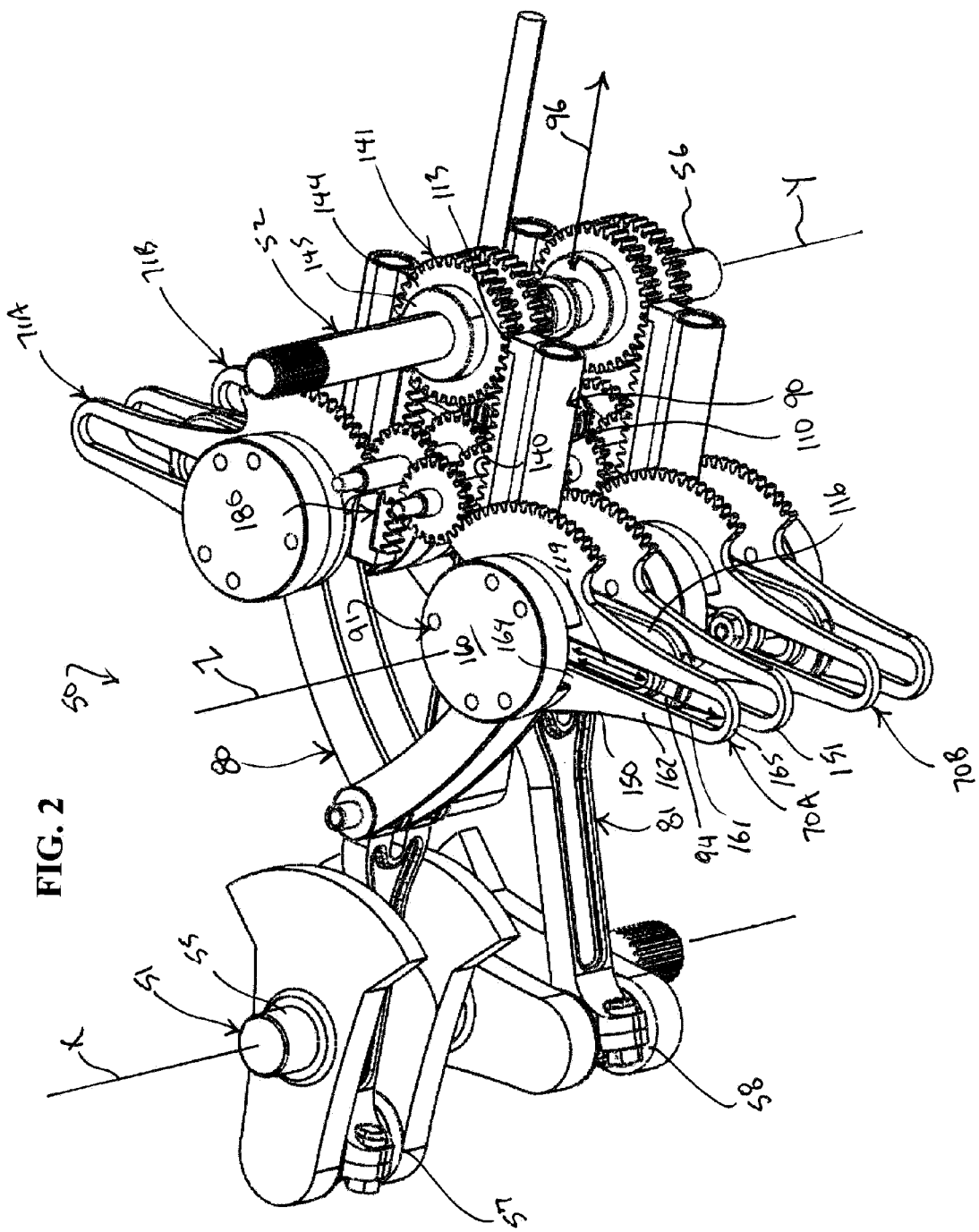
FIGS. 2-4 are isometric views of a transmission of FIG. 1 shown as it would appear without a bridle assembly depicted in FIG. 1.
Figure 3:
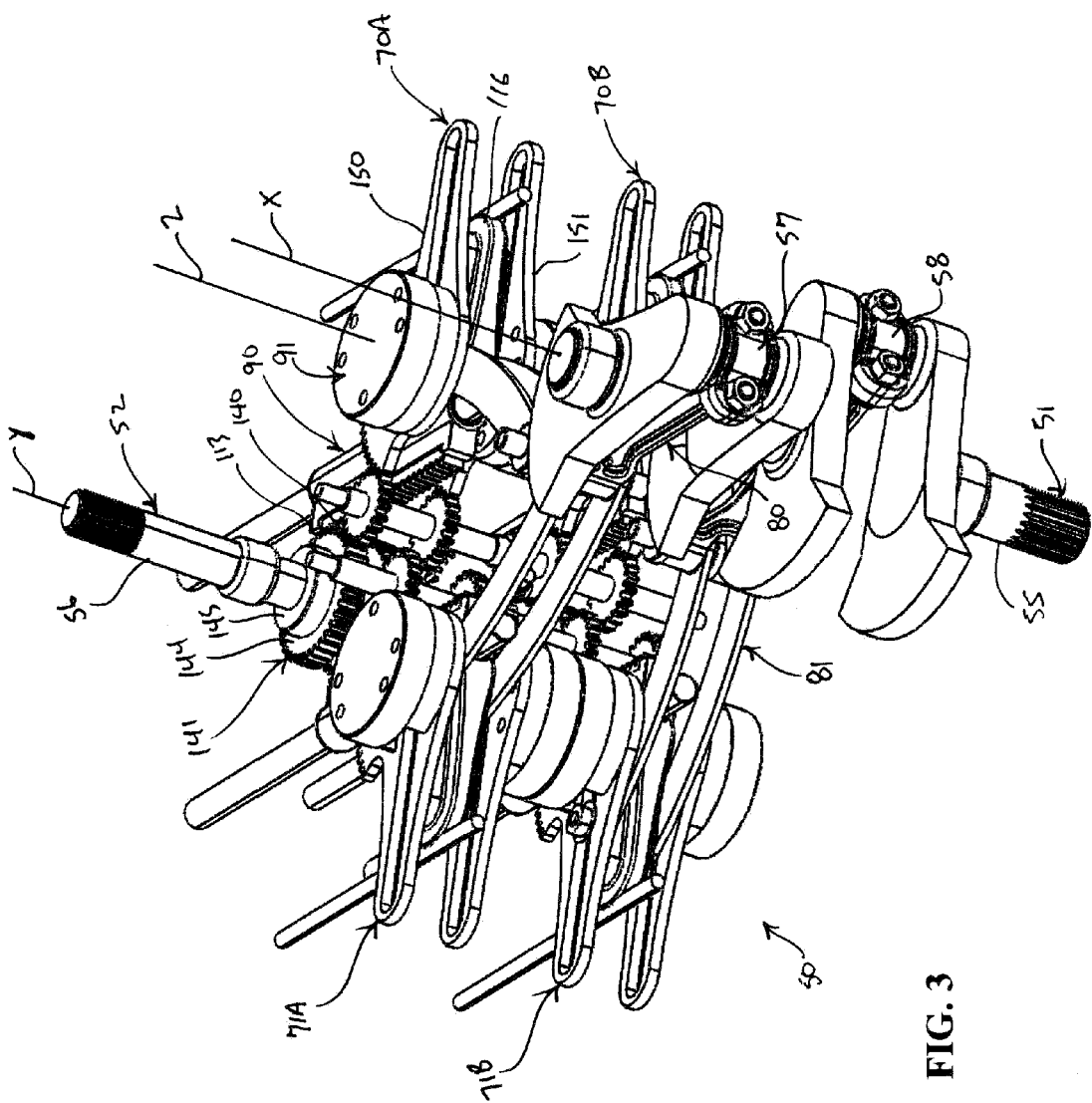
Figure 4:
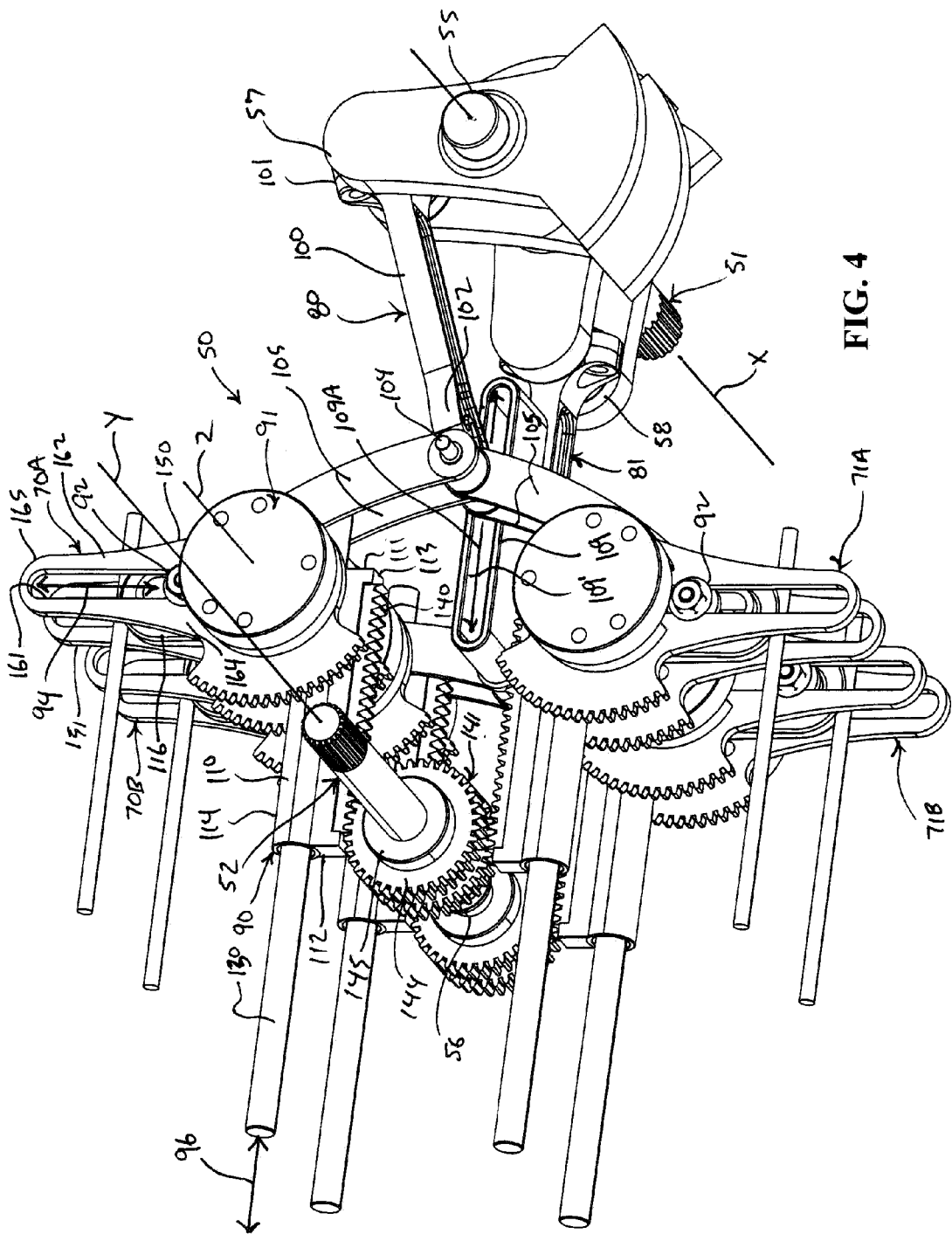

FIGS. 2-4 illustrate transmission apparatus 50 with bridle assembly 60 removed for illustration and reference. Transmission apparatus 50 consists of transmissions 70A and 70B, and opposed transmissions 71A and 71B, each of which are coupled between crankshaft 55 and output 52, and each of which are operable for transferring power from input 51 formed by crankshaft 55 to output 52 formed by output shaft 56. In response to rotation of crankshaft 55, transmissions 70A, 70B, 71A, and 71B work in concert to transfer power from crankshaft 55 to output shaft 56. Transmissions 70A and 70B are located along one side of output 52, and opposed transmissions 71A and 71B are located along the opposing side of output 52. Crankshaft 55 is part of transmission apparatus 50. Crankshaft 55 is entirely conventional, is formed with two offset cranks or crank throws 57 and 58, and is formed as an integral part. Linkage assembly 80 couples transmissions 70A and 71A to crank 57, and linkage assembly 81 couples transmissions 70B and 71B to crank 58. Transmission 70A is superimposed atop transmission 70B, transmission 71A is superimposed atop transmission 71B, transmission 70A is positioned opposite to transmission 71A, and transmission 70B is positioned opposite to transmission 71B. Transmissions 70A and 70B are identical in structure and function. Transmissions 71A and 71B are mirror image opposites of transmissions 70A and 70B, and are, likewise, identical in structure and function. As transmissions 70A and 70B are identical to each other and as transmissions 71A and 71B are mirror image opposites of transmissions 70A and 70B and are identical to each other, transmission 70A will now be discussed, with the understanding that the ensuing discussion of transmission 70A applies equally to transmissions 70B, 71A, and 71B.

Referencing FIG. 4, transmission 70A includes a shuttle 90, a persuader assembly 91, and a lug 92 coupled between shuttle 90 and persuader assembly 91. Linkage assembly 80 couples lug 92 to crank 57 of crankshaft 55 to impart forcible reciprocation of lug 92 along a stroke path denoted by double arrowed line 94 in response to rotation of crankshaft 55. Persuader stroke path 94 is defined by persuader assembly 91.

Figure 19:
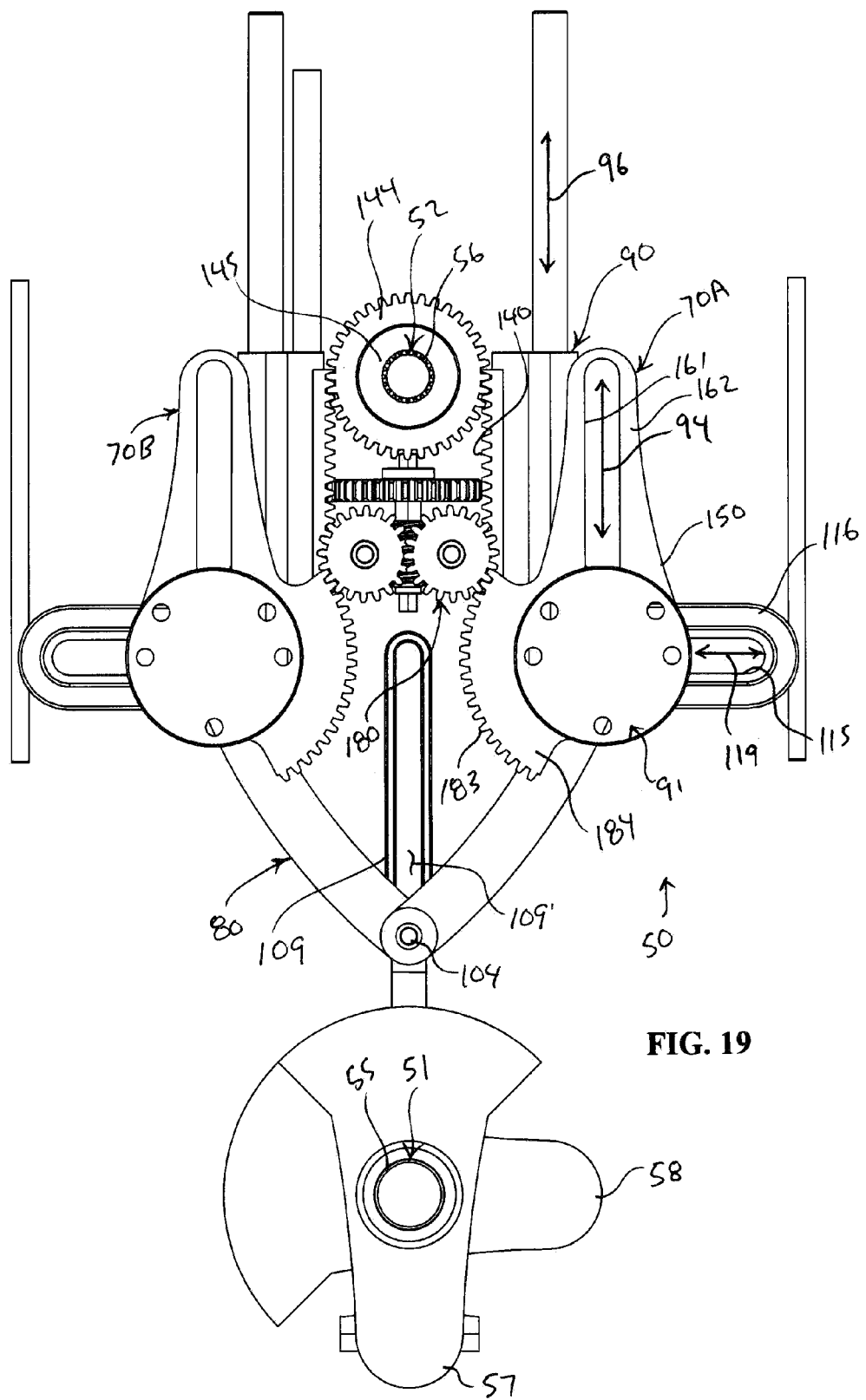

Shuttle 90 is mounted for movement in reciprocal directions, and shuttle 90 is coupled to drive output 52 in response to reciprocation of shuttle 90 along a drive path denoted by double arrowed line 96. Shuttle 90 reciprocates along drive path 96 between a first or starting position toward crankshaft 55 away from output shaft 56 as shown in FIG. 19, and a second or ending position away from crankshaft 55 toward output shaft 56. As will be explained below, the movement stroke of shuttle 90 from its starting position to its ending position is an idle stroke of shuttle 90, and the movement stroke of shuttle 90 from its ending position to its starting position is a drive stroke of shuttle 90.

Figure 20:
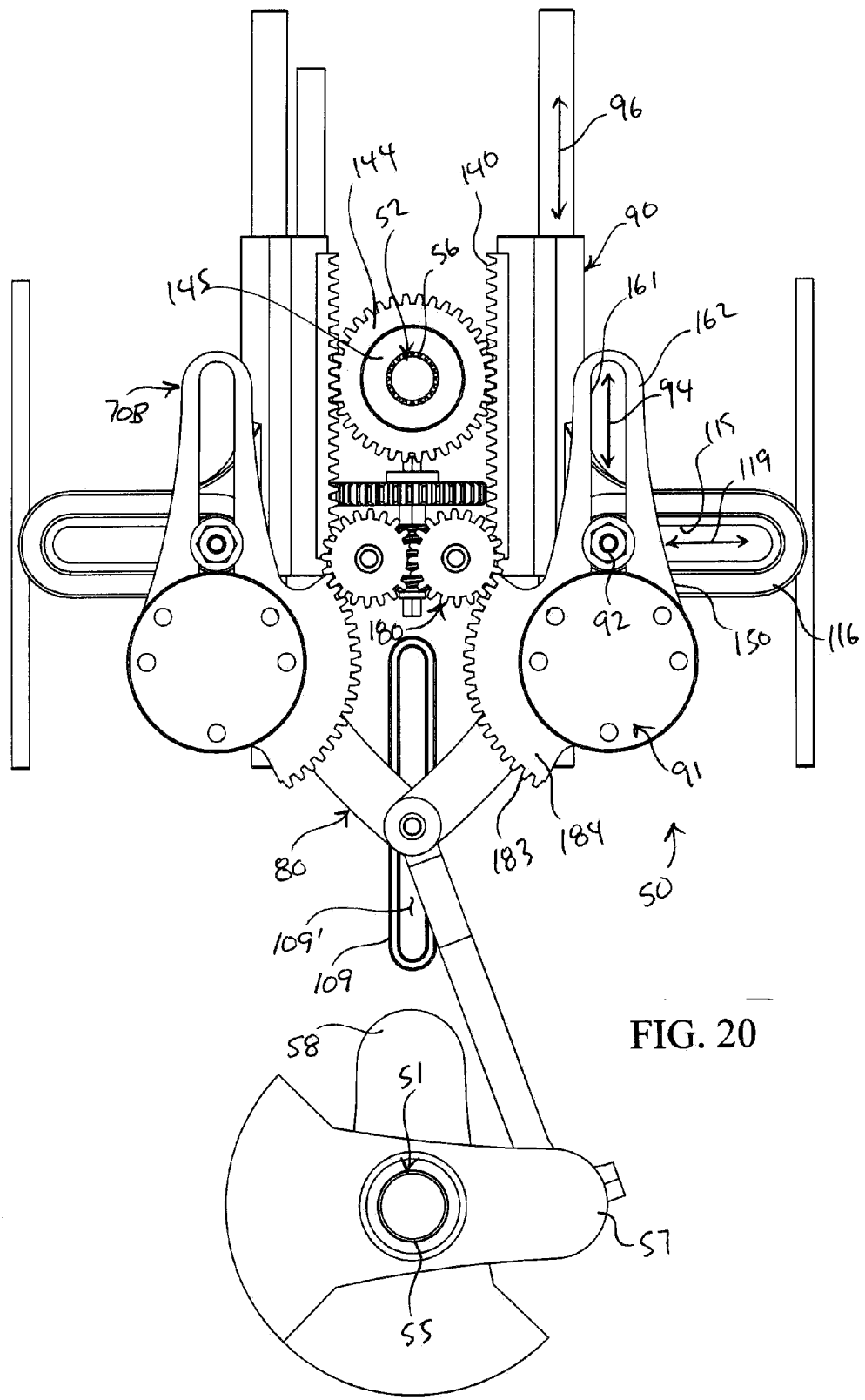
Figure 21:
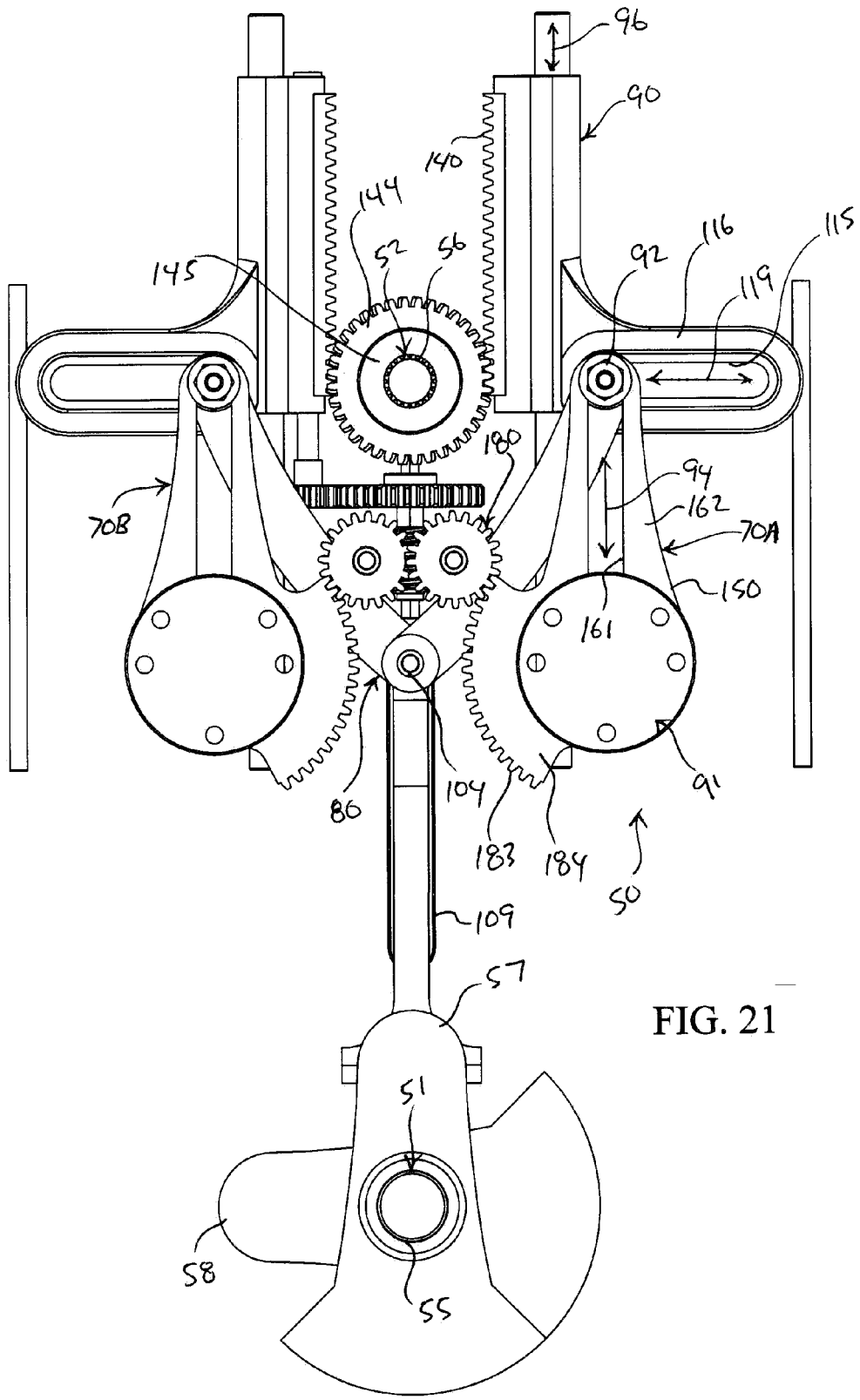

In this specific embodiment, output 52 is an output shaft 56, and shuttle 90 is coupled to drive output shaft 56 for rotation about axis of rotation Y in response to reciprocation of shuttle 90 along drive path 96. The stroke of reciprocal movement of shuttle 90 along drive path 96 has a length. Persuader assembly 91 is coupled between lug 92 and shuttle 90, and is used to change the direction of persuader stroke path 94 of lug 92 relative to drive path 96 of shuttle 90 between an inoperative direction relative to the drive path 94 as shown in FIGS. 4, 7, and 13-15, isolating shuttle 90 from the forcible reciprocation of the lug 92 and an operative direction relative to drive path 96 as shown in FIGS. 19, 20, and 21, transferring the forcible reciprocation of lug 92 along persuader stroke path 94 to shuttle 90 imparting reciprocation of shuttle 90 along drive path 96. Power from input 51 formed by crankshaft 55 is transferred to output 52 formed by output shaft 56 along an infinitely variable torque and gearing ratio or range through the transfer of the forcible reciprocation of lug 92 to shuttle 90 between the inoperative and operative directions of persuader stroke path 94 of lug 92 relative to drive path 96 of shuttle 90 as illustrated in FIGS. 16, 17, and 18.

The inoperative direction of the persuader stroke path 94 is a perpendicular direction of persuader stroke path 94 relative to drive path 96 of shuttle 90 as shown in FIGS. 4, 7, and 13-15, which is an example of a transverse direction of persuader stroke path 94 relative to drive path 96. The operative direction of persuader stroke path 94 is a parallel direction of persuader stroke path 94 relative to drive path 96 of the shuttle 90 as shown in FIGS. 19, 20, and 21. FIGS. 16, 17, and 18 demonstrates a location of the direction of persuader stroke path 94 between the inoperative and operative directions of persuader stroke path 94. In the inoperative direction of persuader stroke path 94 is shown in FIGS. 4, 7, and 13-15, lug 92 reciprocates along persuader stroke path 94 relative to shuttle 90 and persuader assembly 91 in a direction perpendicular relative to drive path 96 and no reciprocation is imparted from lug 92 to shuttle 90 as there is no reciprocation of lug 92 along a path that is linear with respect to drive path 96.

In the operative direction of persuader stroke path 94 as shown in FIGS. 19, 20, and 21, lug 92 reciprocates along persuader stroke path 94 relative to the persuader assembly 91 in a direction that is linear or parallel relative to drive path 96 and reciprocally acts against shuttle 90 reciprocating shuttle 90 along the full length of its stroke path along drive path 96 the full extent of persuader stroke path 94 of lug 92. At a direction of persuader stroke path 94 between the inoperative and operative directions of persuader stroke path 94 of lug 92 as shown in FIGS. 16, 17, and 18, persuader stroke path 94 is angularly disposed relative to drive path 96 between the inoperative and operative directions of persuader stroke path 94 and lug 92 reciprocates along this angled persuader stroke path 94 relative to persuader assembly 91 in a direction that is angular relative to drive path 96. As such, the length or extent of the linear reciprocation of lug 92 relative to drive path 96 is less than in the operative direction of persuader stroke path 94 and, of course, greater than the length or extent of linear reciprocation of lug 92 relative to drive path 96 in the inoperative direction of persuader stroke path 94, which is zero as there is no linear reciprocation of lug 92 along drive path 96 in the inoperative direction of persuader stroke path 94.

Figure 16:
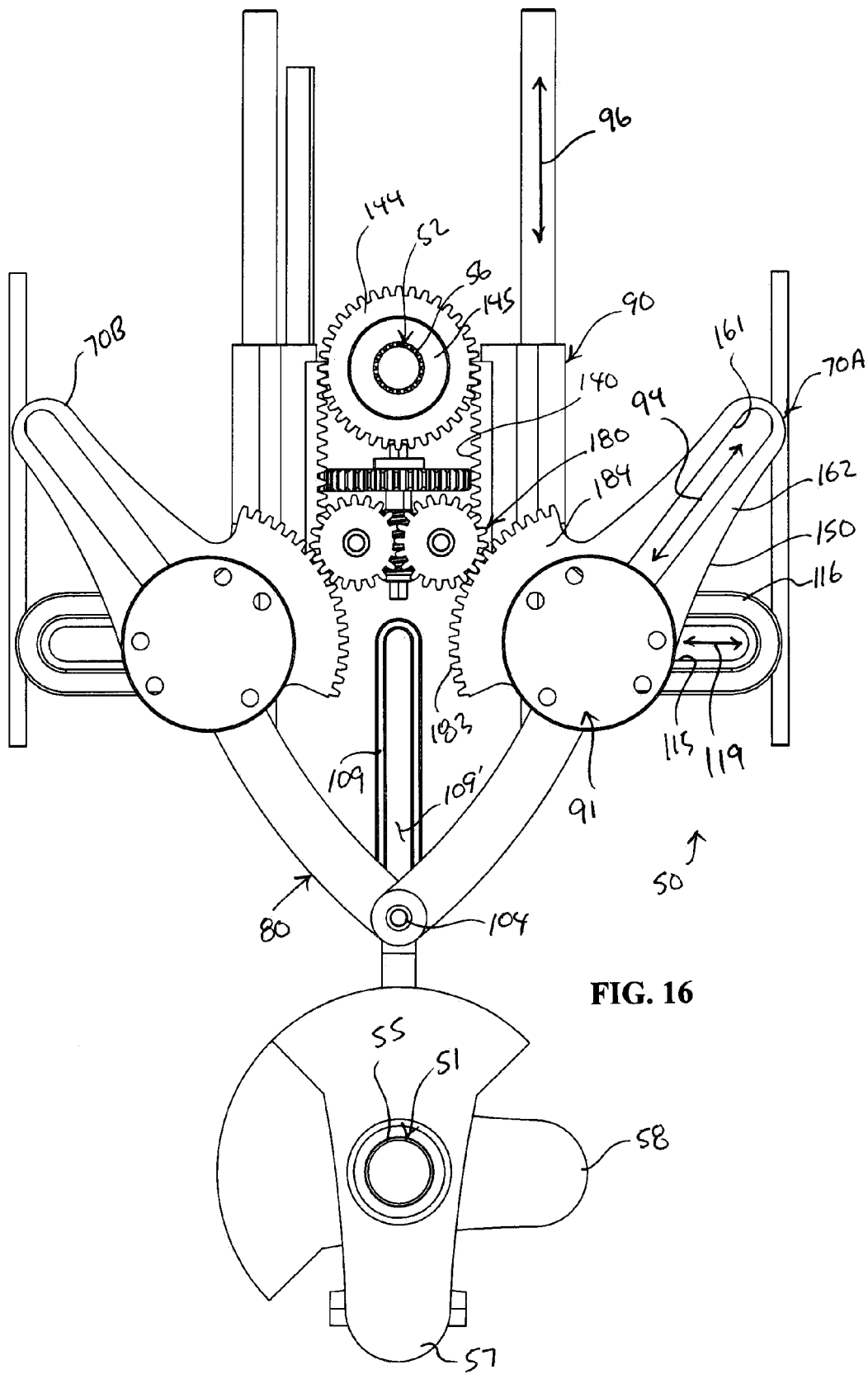
Figure 17:
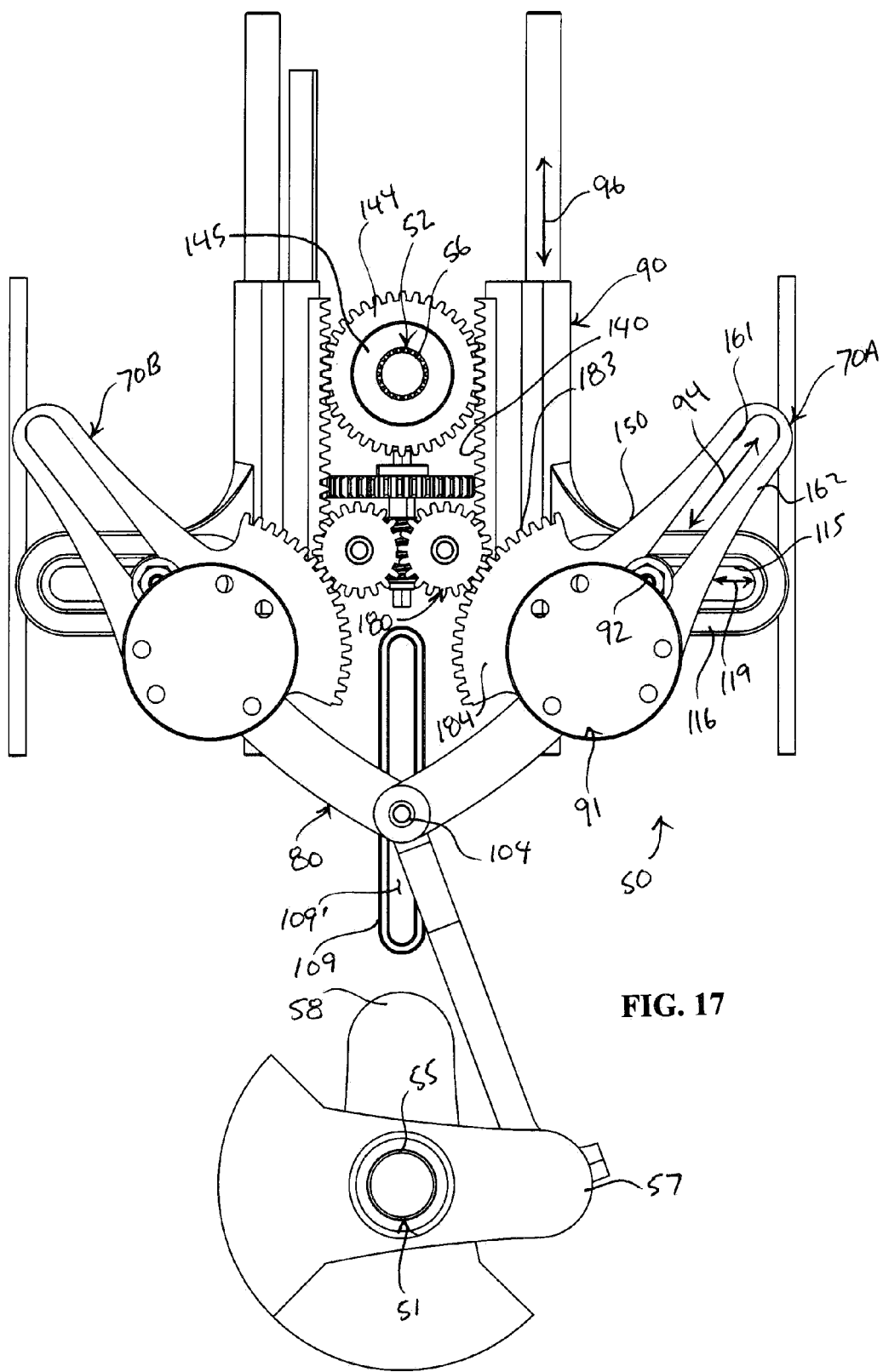
Figure 18:
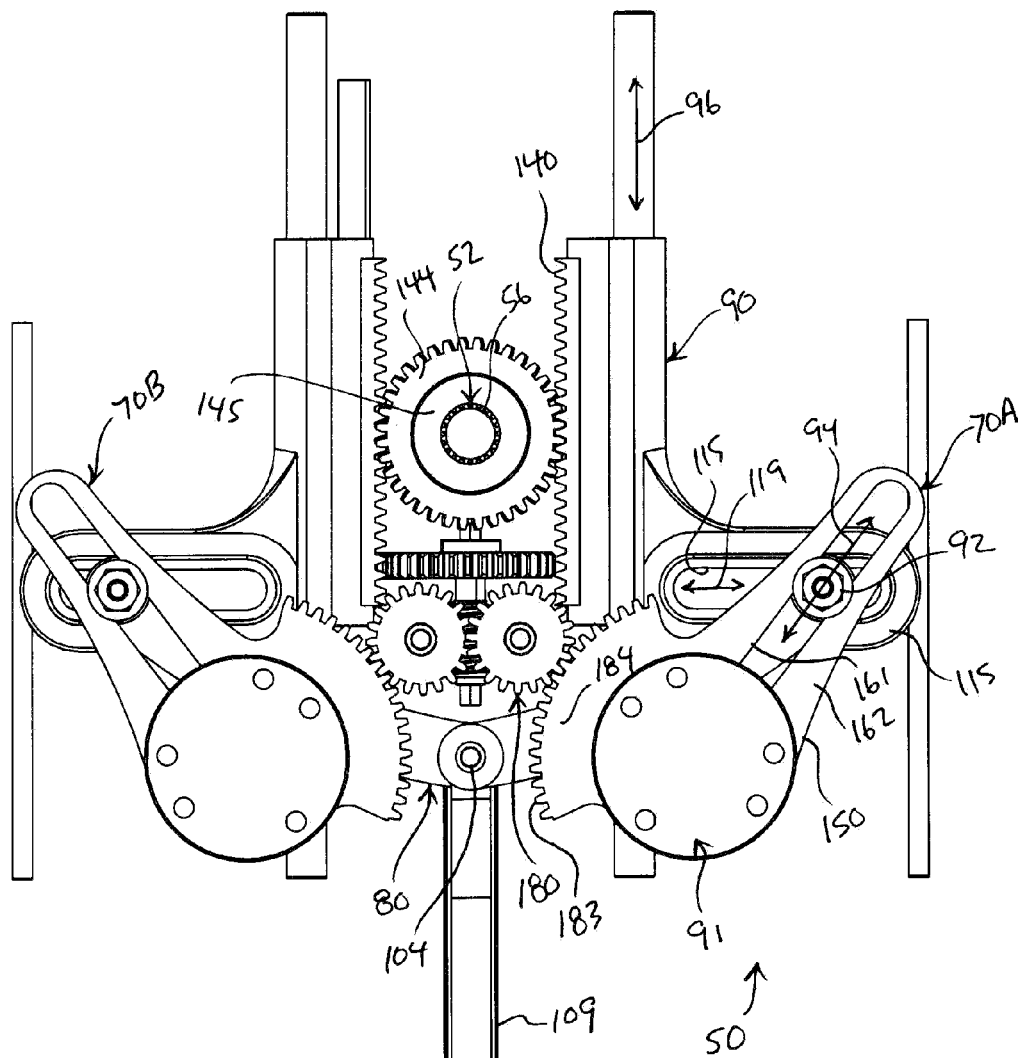
Figure 18:
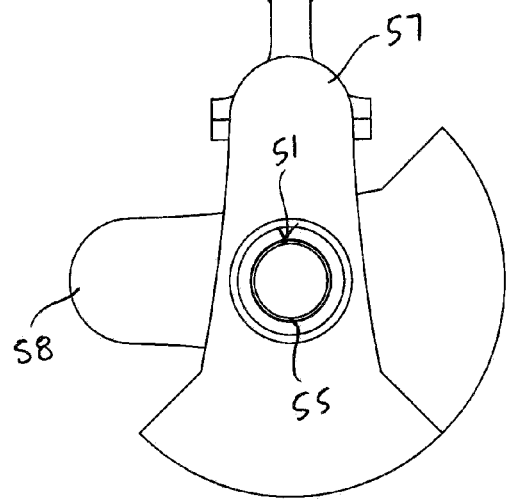

At a direction of persuader stroke path 94 between the inoperative and operative directions of persuader stroke path 94 of lug 92 as shown in FIGS. 16, 17, and 18, as a result, lug 92 reciprocates along persuader stroke path 94 at an angle between the operative and inoperative directions of persuader stroke path 94 reciprocating partially relative to shuttle 90, reciprocates along a shortened length linear lug stroke path relative to the length of the lug stroke path in the operative direction of persuader stroke path 94, and thus partially reciprocally acts against shuttle 90 along shortened length linear lug stroke path relative to drive path 96 thereby partially reciprocating shuttle 90 along drive path 96 along a shortened length of or otherwise a portion of the full length of the stroke path of shuttle 90 along drive path 96 in the operative direction of persuader stroke path 94. Accordingly, the length of reciprocation of lug 92 along persuader stroke path 94 relative to shuttle 90 infinitely decreases from between the inoperative and operative directions of persuader stroke path 94, and infinitely increases from between the operative and inoperative directions of persuader stroke path 94. Further, the length of reciprocation of shuttle 90 along drive path 96 in response to the reciprocal action of lug 92 against shuttle 90 infinitely increases from between the inoperative and operative directions of persuader stroke path 94, and infinitely decreases from between the operative and inoperative directions of persuader stroke path 94.

It is to be emphasized that between the inoperative direction of persuader stroke path 94 to and including the operative direction of persuader stroke path 94, lug 92 reciprocates along a stroke path that is parallel with respect to drive path 96, the length or distance of which infinitely increases from the inoperative direction of persuader stroke path 94 to the operative direction of persuader stroke path 94, and infinitely decreases from the operative direction of persuader stroke path 94 to the inoperative direction of persuader stroke path 94. Accordingly, the length or distance of reciprocation of shuttle 90 along drive path 96 infinitely increases from the inoperative direction of persuader stroke path 94 to the operative direction of persuader stroke path 94, and infinitely decreases from the operative direction of persuader stroke path 94 to the inoperative direction of persuader stroke path 94.

Figure 5:
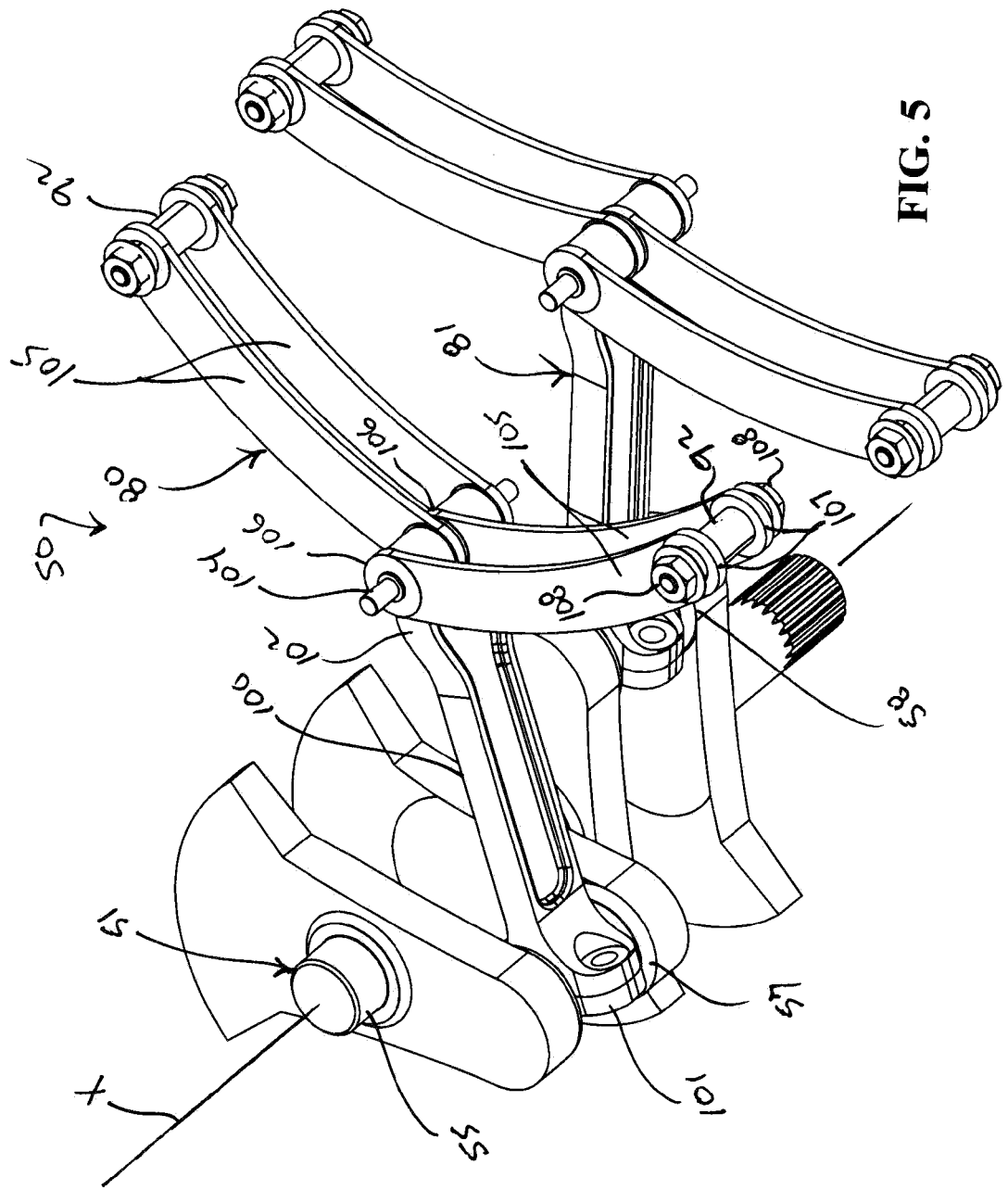
FIG. 5 is an isometric view of linkage assemblies coupled to crank throws of a crankshaft of the transmission of FIG. 1.

As explained above, linkage assembly 80 operatively couples crank 57 of crank shaft 55 to lug 92, and imparts the forcible reciprocation of lug 92 along persuader stroke path 94 in response to rotation of crank shaft 55, and the path or length of reciprocation of lug 92 along persuader stroke path 94 is constant regardless of the position of persuader stroke path 94. Referencing FIG. 5, linkage assembly 80 consists of a connecting rod or crank arm 100 having an inner end 101 coupled to crank 57 and an opposed outer end 102, and a pivot pin 104 pivotally coupling outer end 102 of crank arm 100 to inner ends 106 of opposed, coextensive, parallel link arms 105, which extend outwardly from inner ends 106 at pivot pin 104 to opposed outer ends 107 connected by lug 92 applied to outer ends 107. Inner end 101 of crank arm 100 is conventionally journaled to crank 57 of crankshaft 55. Lug 92 extends between outer ends 107 of link arms 105, and is secured in place with threaded nuts 108 applied to lug 92 along the outer sides of outer ends 107 of opposed link arms 105, respectively. Crank arm 100 has a length extending from inner end 101 to outer end 102, and link arms 105 each have a length extending from inner end 106 thereof to outer end 107 thereof. Crank arm 100 and link arms 105 are substantially equal in length, meaning crank arm 100 and link arms 105 are more equal in length than not. Link arms 105 extend laterally outward from inner ends 106 at pivot pin 104 to opposed outer ends 107 connected by lug 92 applied to outer ends 107 and which is, in turn, applied to shuttle 90 and persuader assembly 91 as shown in FIG. 4. Linkage assembly 80 incorporates corresponding link arms 105, which are offset relative to link arms 105 leading to transmission 70A and which are coupled between pivot pin 104 and a corresponding lug 92 that relates to transmission 71A as shown in relevant part in FIGS. 4 and 5. This offset relationship between link arms 105 relating to transmission 70A and link arms 105 relating to transmission 71A relate the an offset position of transmissions 70A and 71B along crankshaft 55 to allow transmissions 70A and 71A to concurrently act against output shaft 55 as will be explained below. Link arms 105 relating to transmission 70A and link arms 105 relating to transmission 71A project laterally outward in opposite directions from pivot pin 104 to the corresponding transmissions 70A and 71B, and reciprocation is transmitted to the corresponding lugs equally through linkage assembly 80 in response to rotation of crankshaft 55.

Figure 9:
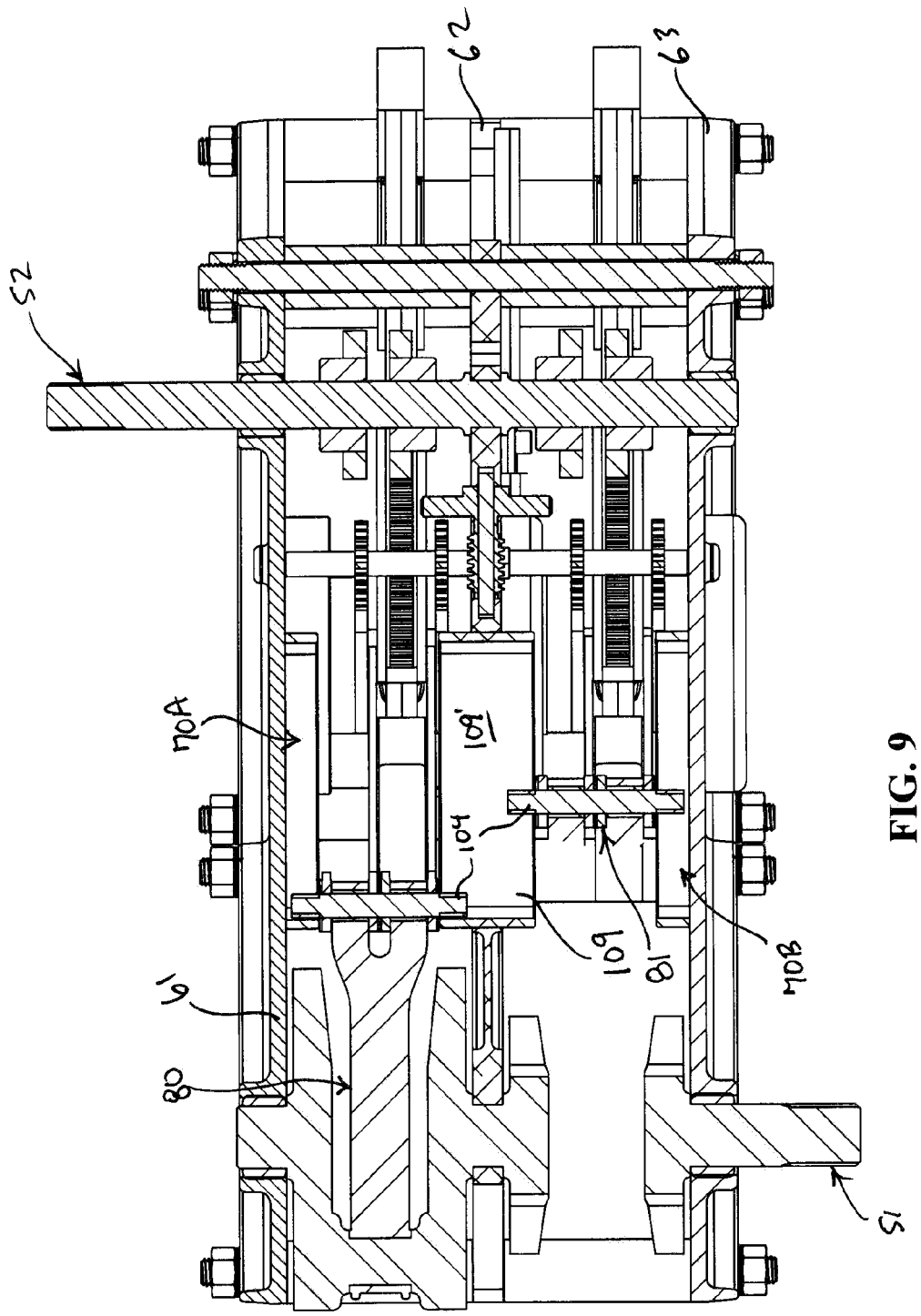
FIG. 9 is a section view taken along line 9-9 of FIG. 1.

A guide 109 formed with a race 109' is positioned between transmissions 70A, 70B, 71A, and 71B as shown in FIG. 4, extends between crankshaft 55 and transmissions 70A, 70B, 71A, and 71B, and is affixed to intermediate plate 62 as shown in FIG. 9. In reference to FIGS. 13-21, race 109' is elongate, is equidistant relative to transmissions 70A and 70B on one side of guide 109, and transmissions 71A and 71B one the opposing side of guide 109, is parallel with respect to drive path 96, and is perpendicular relative to persuader stroke path 94. Pin 104 extends into race 109' of guide 109 as shown in FIG. 9. In response to rotation of crank shaft 55, pin 104 is driven through and reciprocates along race 109' along double arrowed line 109A and is restrained by guide 109 from displacing laterally outwardly from either side of race 109' toward transmissions 70A and 71A, and this allows linkage assembly 80 to concurrently impart equal reciprocation to lug 92 of transmission 70A and to lug 92 of transmission 71A in response to rotation of crankshaft 55. Link arms 105 relating to transmission 70A and link arms 105 relating to transmission 71A project laterally outward in opposite directions from pivot pin 104 applied to race 109' of guide 109 to the corresponding transmissions 70A and 71B formed in either side of guide 109. Linkage assembly 81 relates to race 109' of guide 109 at the underside of guide 109 in the same manner as linkage assembly 80. For reference purposes, in FIG. 9 pin 104 of linkage assembly 81 is shown extending into race 109' of guide 109 from the underside of guide 109.

Figure 6:
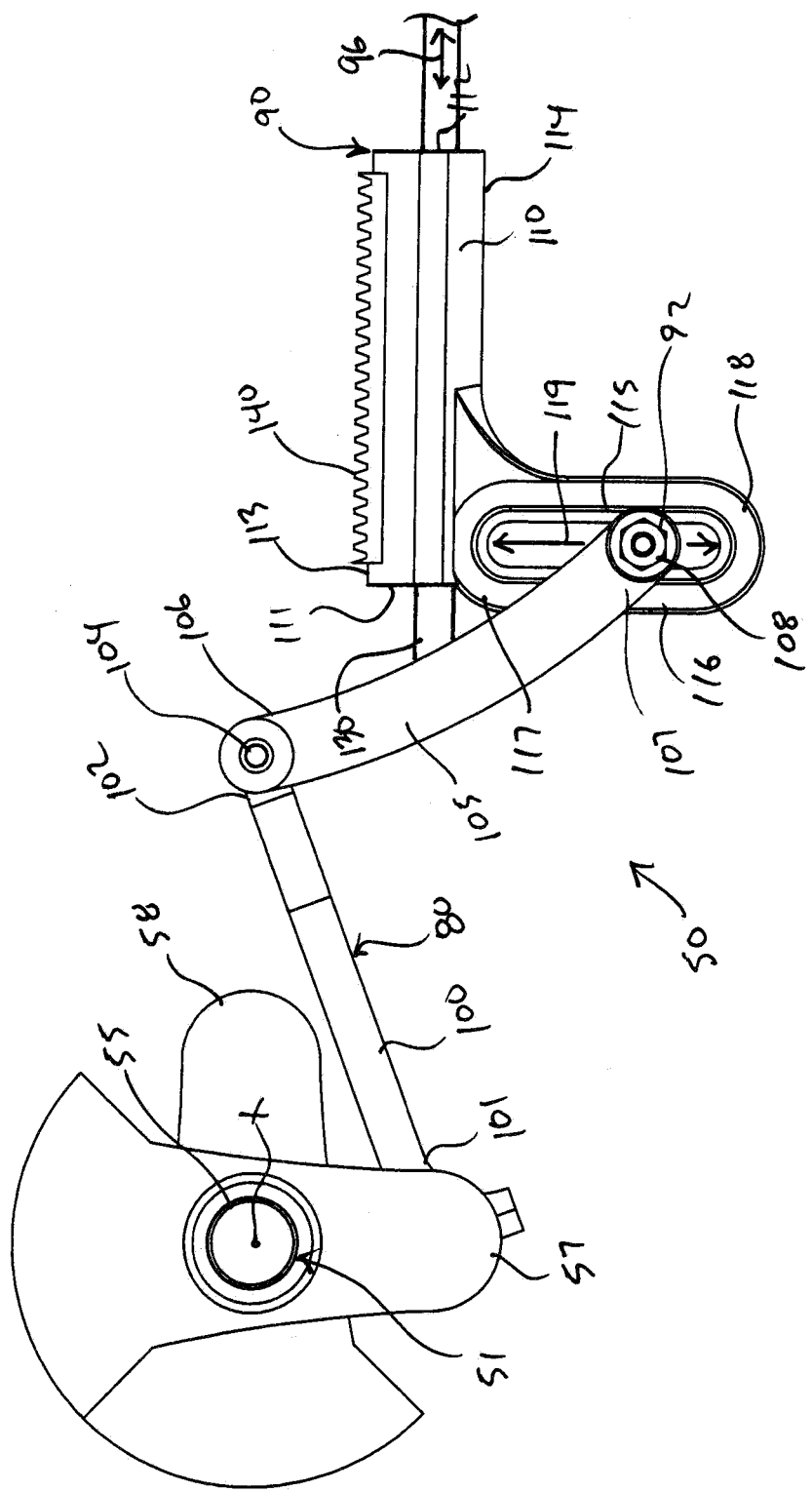
FIG. 6 is a top plan view of transmission elements of the transmission of FIG. 1 including a lug coupled between a shuttle and a linkage coupled to a crankshaft.
Figure 7:
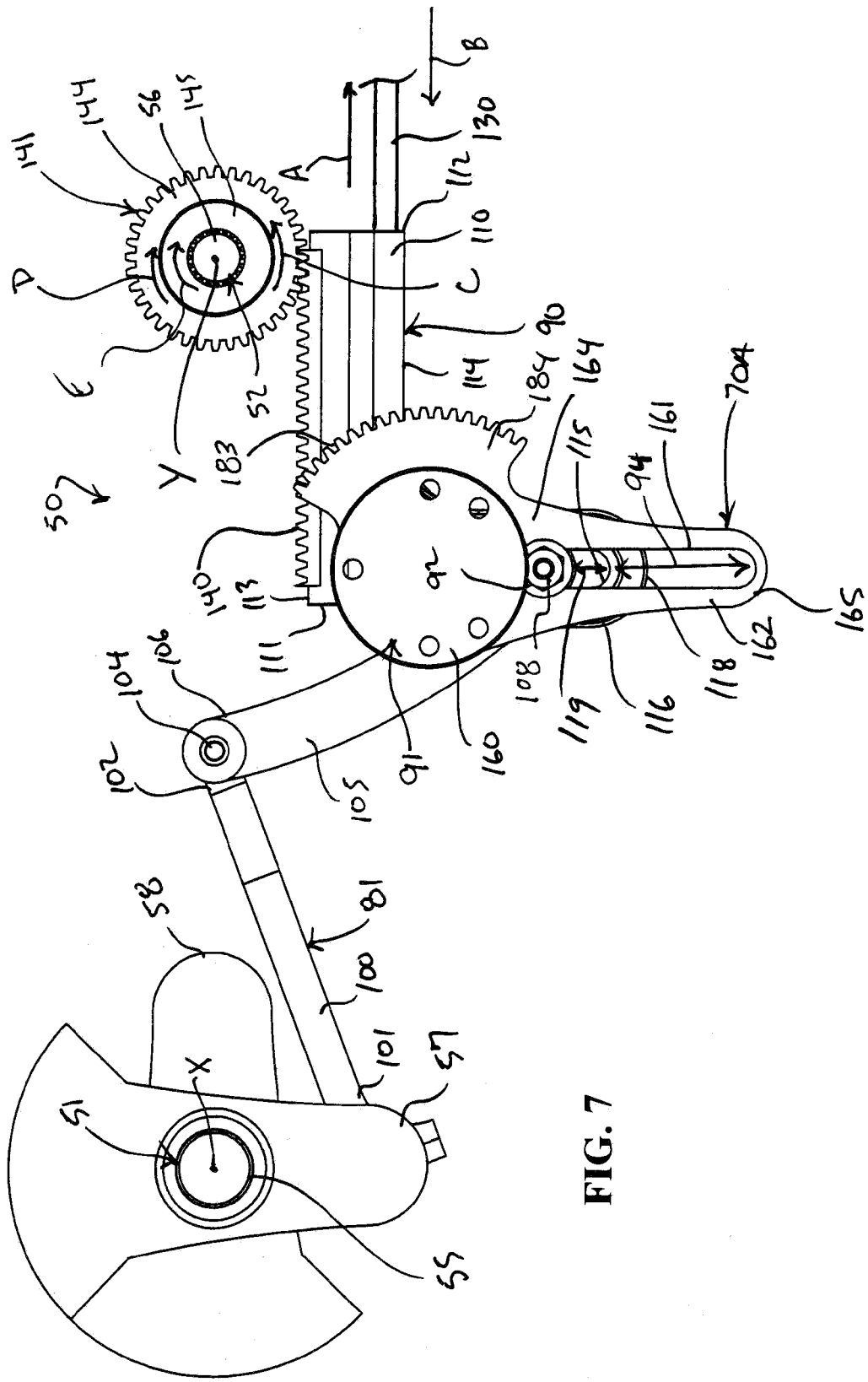
FIG. 7 is a top plan view of transmission elements of the transmission of FIG. 1 including a shuttle coupled to an output, a lug coupled between the shuttle and a persuader, and a linkage coupled between the lug and a crankshaft.

Referencing FIG. 6, shuttle 90 is formed as an integral part and consists of an elongate body 110 having opposed, parallel inner and outer ends 111 and 112, opposed parallel inner and outer sides 113 and 114 extending therebetween, and a race 115 formed in a shuttle arm 116 formed at inner end 111 and which projects outwardly from outer side 114 of elongate body 110. Race 115 is formed in shuttle arm 116, and extends along shuttle arm 116 between an inner end 117 of shuttle arm 116 at outer side 114 of elongate body 110, to an opposed outer end 118 of shuttle arm 116. Race 115 defines a shuttle stroke path denoted by double arrowed line 119. Shuttle stroke path 119 is defined by race 115 of shuttle 90, which is in the form of an elongate slot in this specific embodiment.

Looking to FIGS. 4 and 6, shuttle 90 opposes crankshaft 55 and is mounted for movement in reciprocal directions relative to crankshaft 55 along drive path 96. In the present embodiment, elongate body 110 of shuttle 90 is reciprocated to a rod or rail 130 held and maintained by bridle assembly 60, which is depicted only in FIG. 1. Elongate body 110 encircles rail 130. Rail 130 defines drive path 96, extends through elongate body 110 from inner end 111 to outer end 112, inner and outer sides 113 and 114 of elongate body 110 are parallel relative to rail 130, and shuttle 90 is free to reciprocate along rail 130 relative to crankshaft 55 along drive path 96 between its starting and ending positions shown in FIG. 19 and FIG. 21, respectively. Inner side 113 of elongate body 110 of shuttle 90 is directed inwardly toward transmissions 71A and 71B, outer side 114 of elongate body 110 of shuttle 90 is directed outwardly opposite to inner side 113, shuttle arm 116 projects laterally outward from inner 117 thereof at outer side 114 of elongate body 110 to outer end 118, and race 115 and shuttle stroke path 119 of race 115 extend laterally outward from outer side 114 of elongate body 110 and are each transverse relative to drive path 96. Race 115 and shuttle stroke path 119 are each preferably perpendicular relative to drive path 96, which is an example of a transverse orientation of race 115 and shuttle stroke path 119 of shuttle 90 with respect to drive path 96.

Shuttle 90 is operatively coupled to output shaft 56 to drive output shaft 56 for rotation in only one direction in response to reciprocation of the shuttle 90 along drive path 96. As shown in FIGS. 2-4, shuttle 90 is operatively coupled to output shaft 56 to drive output shaft 56 for rotation with a rack 140 coupled to or otherwise carried by shuttle 90 geared to a clutched gear 141 coupled to output shaft 56. Rack 140 is toothed gear, is linear, extends along inner side 113 of shuttle 90, and extends along substantially the entire length of elon-gate body 110 of shuttle 90 from inner end 111 to outer end 112, which means that rack 140 extends along a majority of the length of elongate body from inner end 111 to outer end 112. Clutched gear 141 consists of a pinion 144 and a conventional sprag clutch 145. Pinion 144 and sprag clutch 145 concurrently encircle output shaft 56. Sprag clutch 145 is coupled between pinion 144 and output shaft 56. Pinion 144 meshes with rack 140.

Shuttle 90 is free to reciprocate along drive path 96 in reciprocal directions relative to crankshaft 55 in a first direction away from crankshaft 55 along its idle stroke in a direction indicated by arrowed line A, and an opposite second direction toward crankshaft 55 along its drive stroke in a direction indicated by arrowed line B. In response to movement of shuttle 90 away from crankshaft 55 in the direction indicated by arrowed line A along its idle stroke, the meshing interaction between rack 140 and pinion 144 rotates pinion 144 about axis of rotation Y of output shaft 56 in the direction indicated by arcuate arrowed line C. In response to movement of shuttle 90 toward crankshaft 55 in the direction indicated by arrowed line B along its drive path, the meshing interaction between rack 140 and pinion 144 rotates pinion 144 about axis of rotation Y of output shaft 56 in the direction indicated by arcuate arrowed line D, which is a rotational direction opposite to the direction of rotation indicated by arcuate arrowed line C. In response to movement of shuttle 90 away from crankshaft 55 in the direction indicated by arrowed line A along its idle stroke imparting rotation of pinion about axis of rotation Y of output shaft 56 in the direction indicated by arcuate arrowed line C, sprag clutch 145 disengages pinion 144 allowing pinion 144 to rotate about and relative to output shaft 56 in the direction indicated by arcuate arrowed line C idling pinion 144 from output shaft 56. In response to movement of shuttle 90 toward crankshaft 55 in the direction indicated by arrowed line B along its drive path imparting rotation of pinion about axis of rotation Y of output shaft 56 in the direction indicated by arcuate arrowed line D, sprag clutch 145 engages pinion 144 operatively securing pinion 144 to output shaft 56 driving output shaft 56 for rotation in a drive direction indicated by arcuate arrowed line E, which is the same rotational direction as pinion 144 indicated by arcuate arrowed line D. And so movement of shuttle 90 away from crankshaft 55 in the direction indicated by arrowed line A along its idle stroke is an idling direction of shuttle 90 whereby output shaft 56 is free of a driving influence from the interaction of rack 140 and pinion 144, and movement of shuttle 90 toward crankshaft 55 in the direction indicated by arrowed line B along its drive stroke is a driving direction of shuttle 90 whereby output shaft 56 is driven for rotation in the direction indicated by arcuate arrowed line E through the interaction of rack 140 and pinion 144.

Referencing FIGS. 2-4, persuader assembly 91 consists of opposed, corresponding persuaders 150 and 151. Persuaders 150 and 151 are located on either side of shuttle 90 along inner end 111 of shuttle 90, and persuader 150 is superimposed atop persuader 151, whereby persuader 150 is the uppermost one of persuaders 150 and 151, and persuader 151 is the lowermost one of persuaders 150 and 151. Persuader 151 is the mirror image of persuader 150, and the specific details of persuader 150 will now be discussed and apply in every respect to persuader 151. Where appropriate, identical reference numerals are used in connection with persuaders 150 and 151.

With additional reference to FIG. 6, persuader 150 is formed as an integral part and consists of a circular bearing head 160, and a race 161 formed in a persuader arm 162 and which projects outwardly from bearing head 160. Race 161 is formed in persuader arm 162, and extends along persuader arm 162 between an inner end 164 of persuader arm 162 at bearing head 160 and an opposed outer end 165 of persuader arm 162. Race 161 defines persuader stroke path 94. Persuader stroke path 94 is defined by race 161 of persuader 150, which is in the form of an elongate slot in this specific embodiment.

Figure 10:
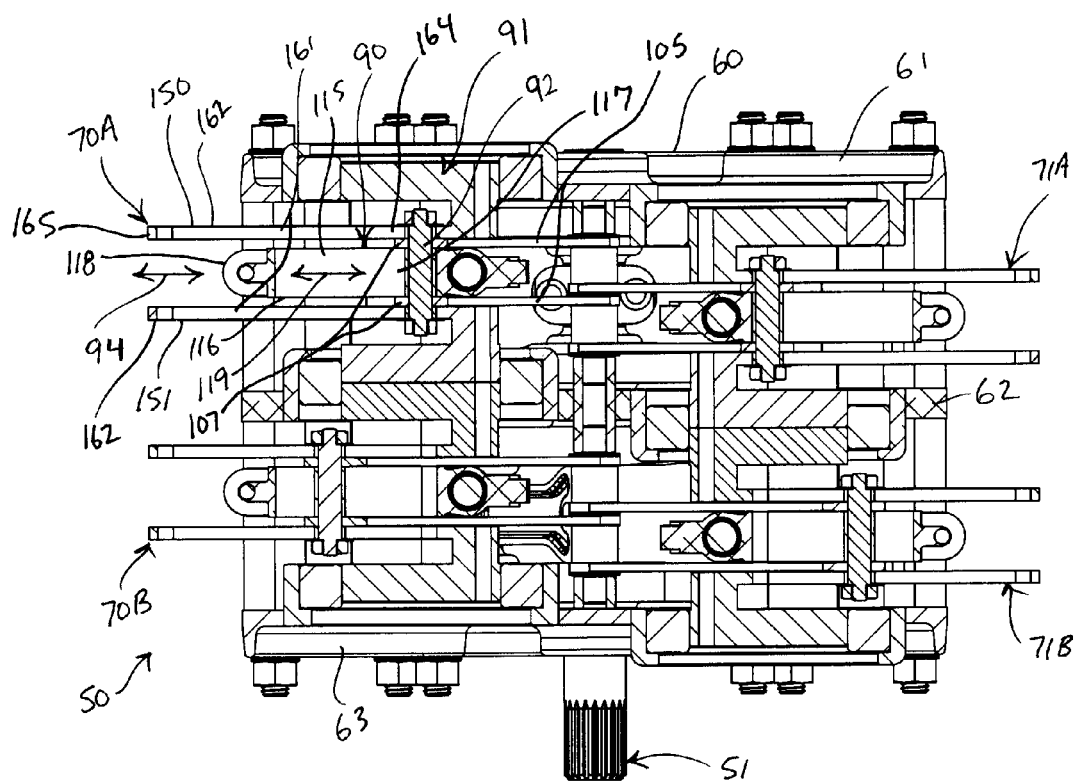
FIG. 10 is a section view taken along line 10-10 of FIG. 1.
Figure 11:
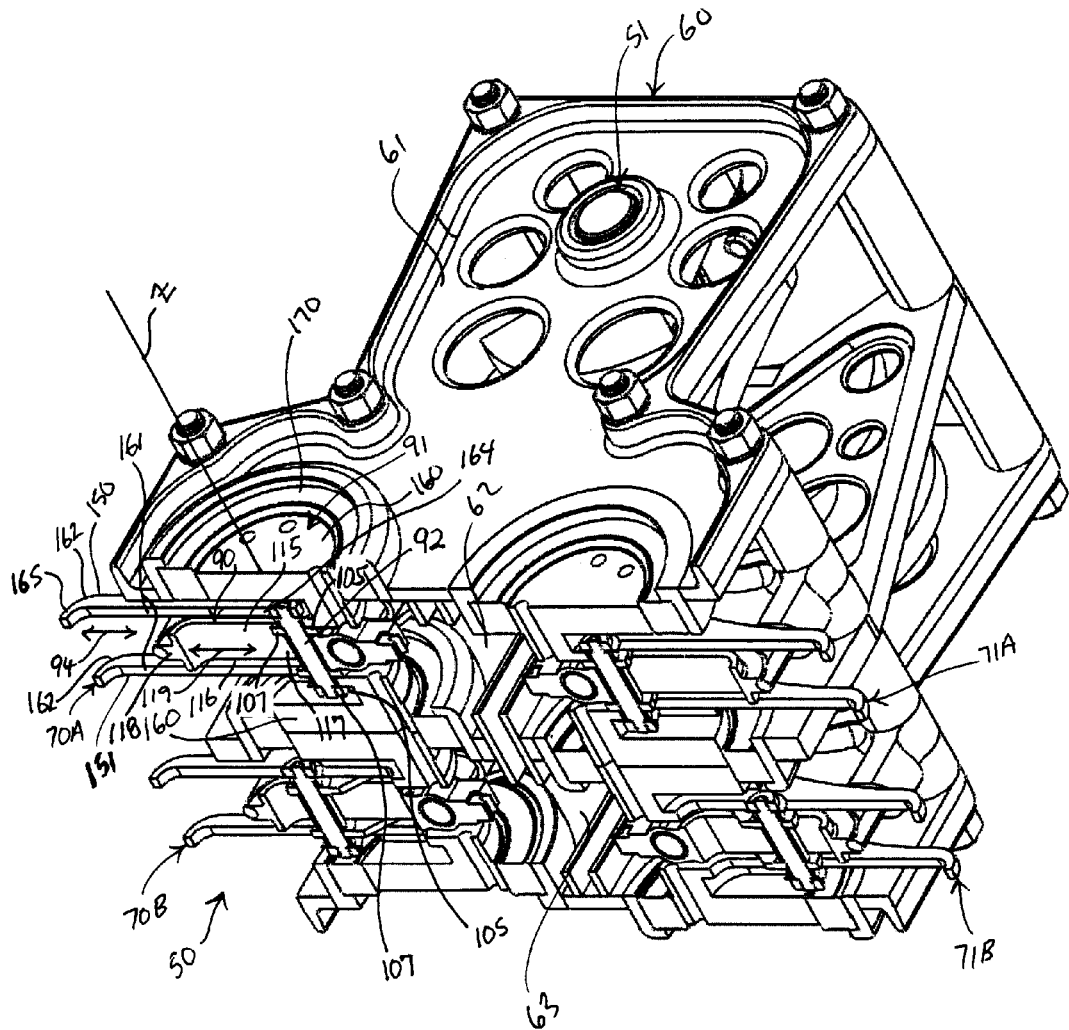
FIG. 11 is an isometric view of the embodiment of FIG. 10.
Figure 12:
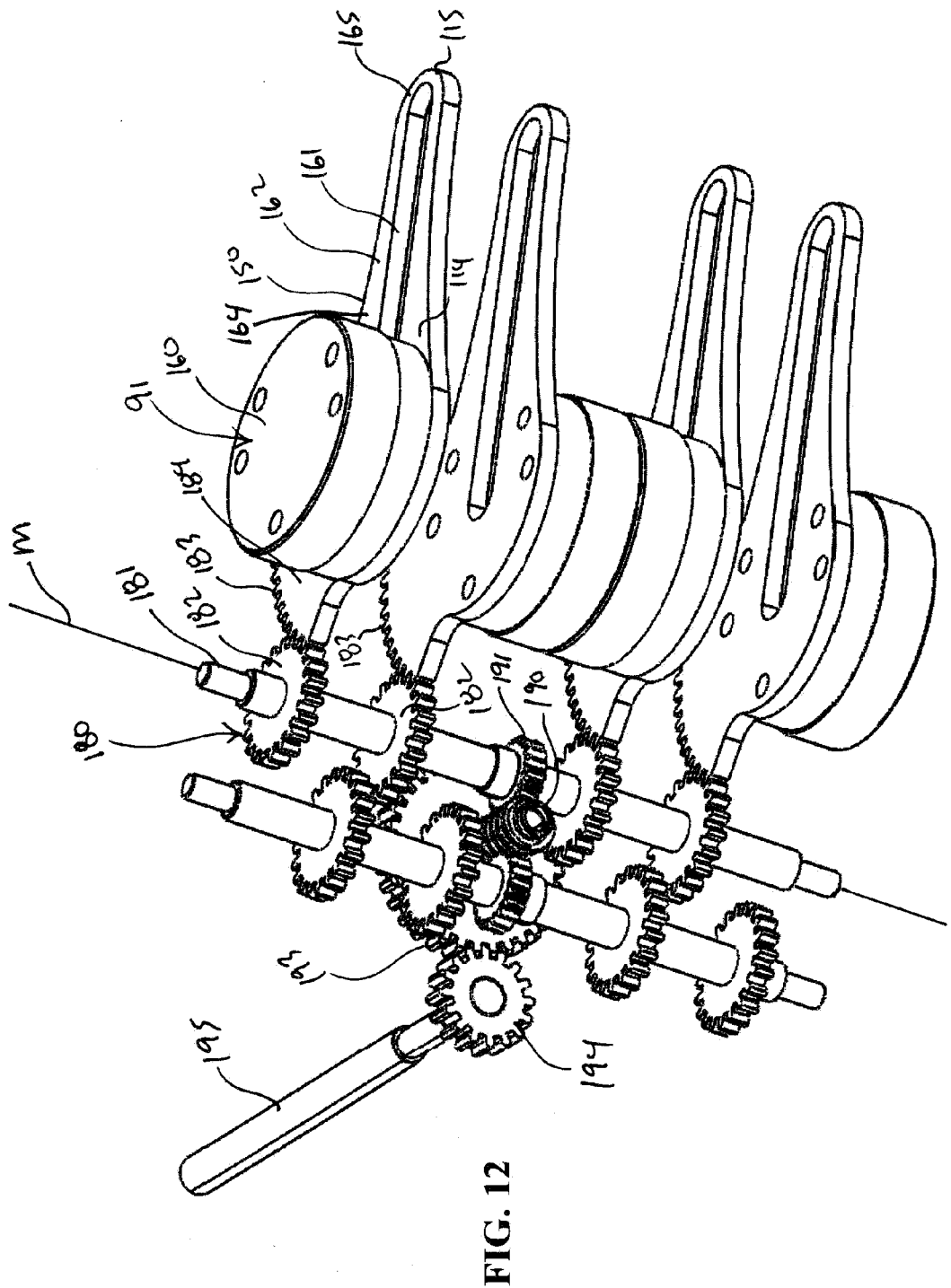
FIG. 12 is an isometric view of a persuader gear assembly of the transmission of FIG. 1.

Shuttle 90 is positioned between persuaders 150 and 151 as best seen in FIGS. 2-4, 8, 10, and 11. Persuaders 150 and 151 oppose one another in a mirror image orientation and are parallel respect to each other, and races 161 of persuaders 150 and 151 and corresponding stroke paths 94 thereof are registered with and are located on either side of race 115 of shuttle 90 as shown in FIGS. 2-4, 10, and 11. As best shown in FIGS. 10 and 11, outer ends 107 of link arms 105 are applied between arms 162 of persuaders 150 and 151, shuttle arm 116 is positioned between arms 162 of persuader 150. Lug 92 carried by outer ends 107 of link arms 105 is applied to and extends concurrently into and through race 115 of shuttle 90 and races 161 of persuaders 150 and 151, and is secured in place with threaded nuts 108 applied to lug 92 along the outer sides of persuader arms 162 of opposed persuaders 150 and 151, respectively. Lug 92 is free to reciprocate along race 115 of shuttle 90 along shuttle stroke path 119 of shuttle 90, and is free to concurrently reciprocate in races 161 of persuaders 150 and 151 along persuader stroke paths 94 of persuaders 150 and 151. As lug 92 is free to reciprocate in race 115 of shuttle 90 along shuttle stroke path 119 of shuttle 90, and is free to concurrently reciprocate in races 161 of persuaders 150 and 151 along persuader stroke paths 94 of persuaders 150 and 151, shuttle stroke path 119 is a shuttle stroke path of lug 92, and persuader stroke paths 94 are each a persuader stroke path of lug 92.

Figure 8:
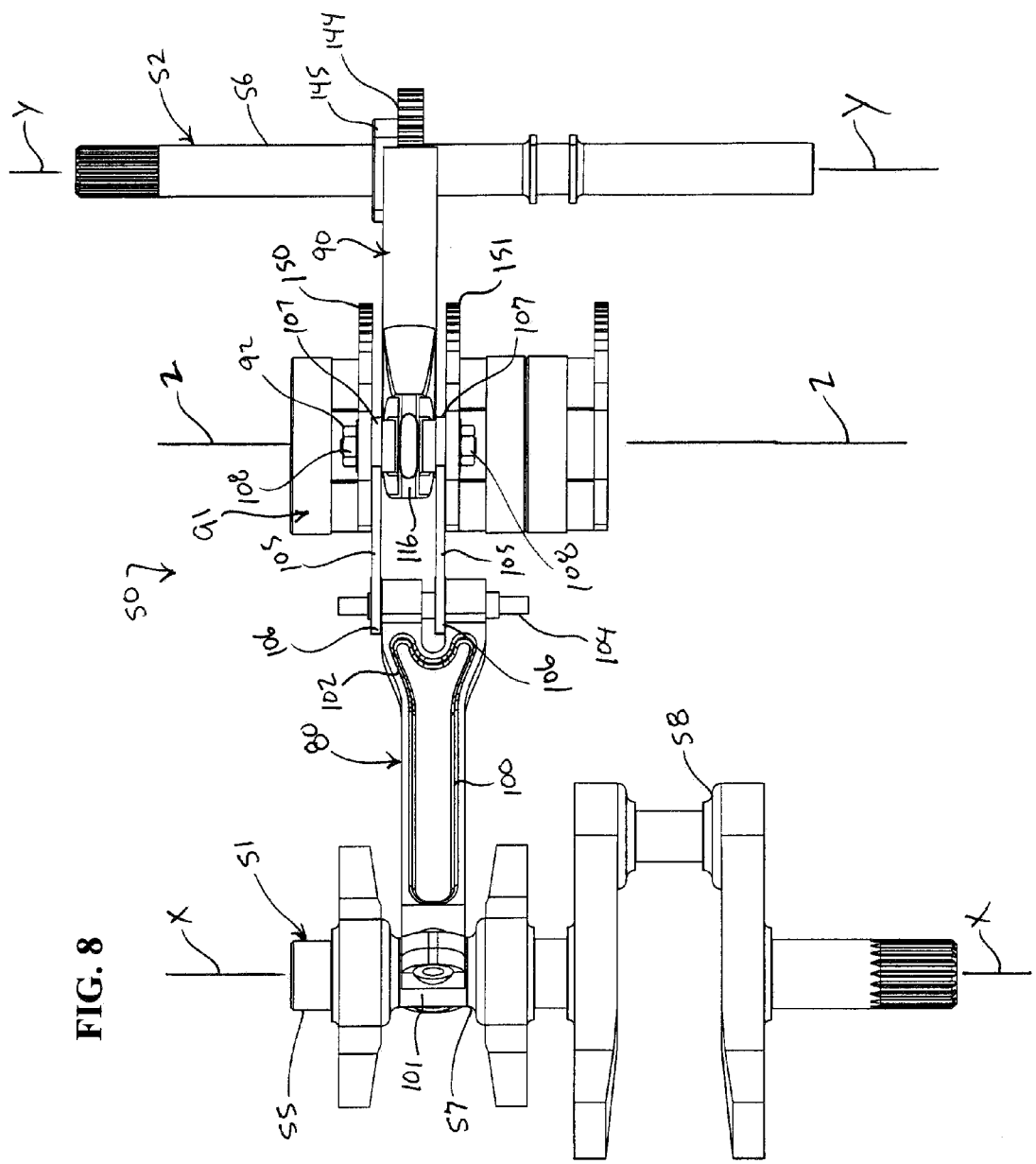
FIG. 8 is a side elevation view of the embodiment of FIG. 7.

Persuader 150 and persuader 151 forming persuader assembly 91 are each mounted for concurrent rotation about axis of rotation Z between a first or idle position as shown in FIGS. 2-4, 7, and 13-15, and a second or drive position as shown in FIGS. 19-21 to change persuader stroke paths 94 of lug 92 between the inoperative direction relative to the drive path 94 as shown in FIGS. 2-4, 7, and 13-15 isolating shuttle 90 from the forcible reciprocation of lug 92, and an operative direction relative to drive path 96 as shown in FIGS. 19, 20, and 21 transferring the forcible reciprocation of lug 92 along persuader stroke path 94 to shuttle 90 imparting corresponding reciprocation of shuttle 90 along drive path 96, whereby power from input 51 formed by crankshaft 55 is transferred to output 52 formed by output shaft 56 along an infinitely variable torque and gearing ratio or range through the transfer of the forcible reciprocation of lug 92 to shuttle 90 between the inoperative and operative directions of persuader stroke path 94 of lug 92 relative to drive path 96 of shuttle 90 as illustrated in FIGS. 16, 17, and 18. As best shown in FIG. 8, axis of rotation Z of persuaders 150 and 151 of persuader assembly 91 is between and is parallel to axes of rotation X and Y of crankshaft 55 and output shaft 56, respectively.

Persuader 150 is mounted for rotation at head 160. Referencing FIGS. 1 and 11, head 160 is mounted for rotation to a conventional ring bearing 170 formed in upper plate 61 of bridle assembly 60, and axis Z of rotation of persuader 150 is at the geometric center of head 160. Persuader 151 is mounted for rotation in the same way to intermediate plate 62. As shown in FIG. 11, head 160 of persuader 151 is mounted for rotation to a conventional ring bearing 170 formed in intermediate plate 62 of bridle assembly 60.

Persuaders 150 and 151 are rotated with a persuader drive assembly or rotator denoted at 180 in FIGS. 2, 3, 8, 9, and 12, which is positioned between transmissions 70A and 70B, and transmissions 71A and 71B, and which is further positioned between guide 109 and output shaft 56 as shown in FIGS. 2 and 3. For the purpose of illustration and reference, drive assembly 180 is not depicted in FIG. 4. Persuader drive assembly 180 is operatively coupled to persuaders 150 and 151, and consists of a persuader shaft 181 mounted for rotation, and which is operatively coupled to persuaders 150 and 151 to rotate persuaders 150 and 151 between the idle and drive positions of persuaders 150 and 151 in response to rotation of persuader shaft 181.

Persuader shaft 181 is operatively coupled to the persuader 91 with gearing formed between persuader shaft 181 and persuaders 150 and 151. The gearing formed between persuader shaft 181 and persuader 150 consists of a pinion 182 carried by persuader shaft 181 that is geared to a corresponding partial gear 183 coupled to or otherwise carried by persuader 150 as part of persuader 150. Partial gear 183 is exemplary of an arcuate rack gear and may be referred to as such. Referencing FIG. 7, partial gear 183 is toothed gear, is arcuate, and is carried by a marginal extremity of a plate 184 formed in persuader 150 opposing arm 162. Partial gear 183 and pinion 182 are identically formed between persuader 151 and persuader shaft 181. Pinions 182 rotate in response to rotation of persuader shaft 181, which rotates about axis M. To adjust persuaders 150 and 151 from their idle positions to their drive positions, persuader shaft 181 is rotated in a first rotational direction imparting corresponding rotation to pinions 182, which interact with racks 183 to concurrently rotate persuaders 150 and 151 from their idle positions to their drive positions. To adjust persuaders 150 and 151 from their drive positions to their idle positions, persuader shaft 181 is rotated in an opposite second rotational direction imparting corresponding rotation to pinions 182, which interact with racks 183 to concurrently rotate persuaders 150 and 151 from their drive positions to their idle positions.

Persuader shaft 181 is rotated with a drive train consisting of a worm gear 190 geared to a corresponding pinion 191 carried by persuader shaft 181. Worm gear 190 is formed with a rotated pinion 193 geared to a corresponding drive pinion 194 carried by a drive shaft 195 coupled to an input, such as to a motor. Rotation of drive shaft 195 rotates drive pinion 194, which rotates pinion 193 that, in turn, imparts rotation to worm gear 190. Rotation of worm gear 190, in turn, rotates pinion 191 formed with persuader shaft 181 thereby imparting rotation to persuader shaft 181. Drive shaft 195 is selectively rotated in opposite directions for producing corresponding rotation of persuader shaft 181 to adjust persuaders 150 and 151 between their idle and drive positions. Persuader shaft 181 associates with transmission 70B in the same way as with transmission 70A. Furthermore, persuader drive assembly 180 also incorporates a corresponding persuader shaft that is operable with transmissions 71A and 71B, and that is driven by worm gear 190 of the drive train. The drive train described to impart persuader rotation is set forth by way of example, and any suitable drive train or system can be used to apply persuader rotation as may be desired.

And so the stroke of reciprocal movement of shuttle 90 along drive path 96 has a length, which is determined by the position of persuader 150 setting the direction of reciprocation of lug 92 along persuader stroke path 94. In the idle position of persuader 150, shuttle 90 is isolated from the forcible reciprocation of lug 92 and there is no reciprocation transferred from lug 92 to shuttle 90 and shuttle is stationary. In the drive position of persuader 150, shuttle 90 is fully reciprocally engaged to or otherwise reciprocated to lug 92 and lug 92 acts against shuttle 90 and reciprocates along a maximum stroke length or distance of reciprocation of shuttle 92 along stroke path 96 transferring maximum speed and torque from crankshaft 55 to output shaft 56. As persuader 150 moves between its idle position and its drive position, lug 92 is partially reciprocally engaged to or otherwise reciprocated to shuttle 90 and lug 92 partially reciprocally acts against shuttle 90 by reciprocating along its lug stroke path in a direction linear to or otherwise parallel with respect to drive path at lengths greater than and less than the linear length of reciprocation of lug 92 in the inoperative and operative directions of persuader stroke path 94. And so the length or distance of reciprocation of shuttle 90 applied to shuttle 90 from lug 92 infinitely increases from the idle position of persuader 150 to the drive position of persuader 150, and infinitely decreases from the drive position of persuader 150 to the idle position of persuader 150. In other words, the distance of reciprocation of shuttle 90 along drive path 96 infinitely increases from the idle position of persuader 160 to the drive position of persuader 150, and infinitely decreases from the drive position of persuader 150 to the idle position of persuader 150, and so speed and torque applied from crankshaft 55 to output shaft 56 infinitely increases from the idle position of persuader 160 to the drive position of persuader 150, and infinitely decreases from the drive position of persuader 150 to the idle position of persuader 150.

Figure 13:
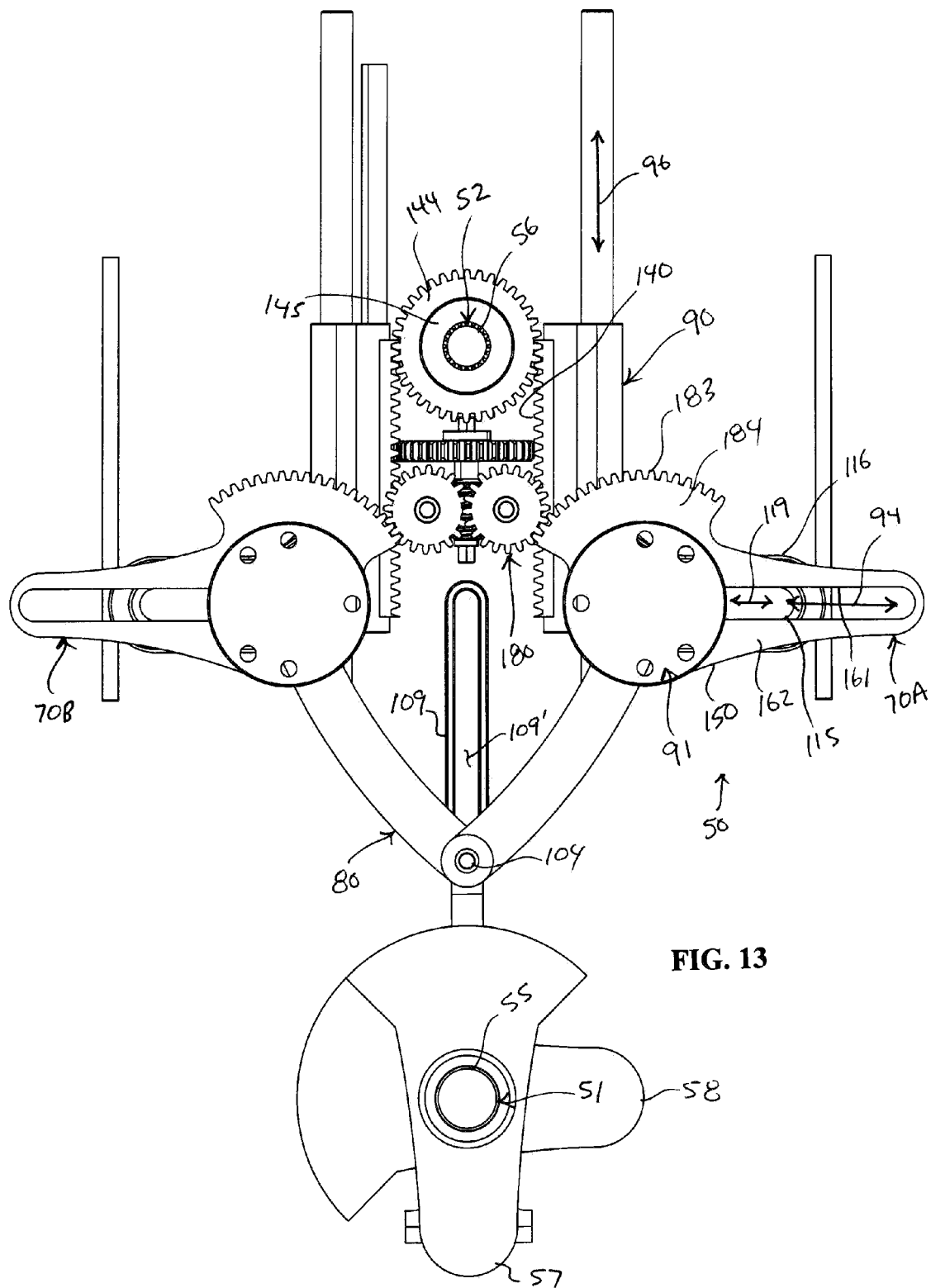
FIGS. 13-21 show a sequence of operation of the transmission of FIG. 1.
Figure 14:
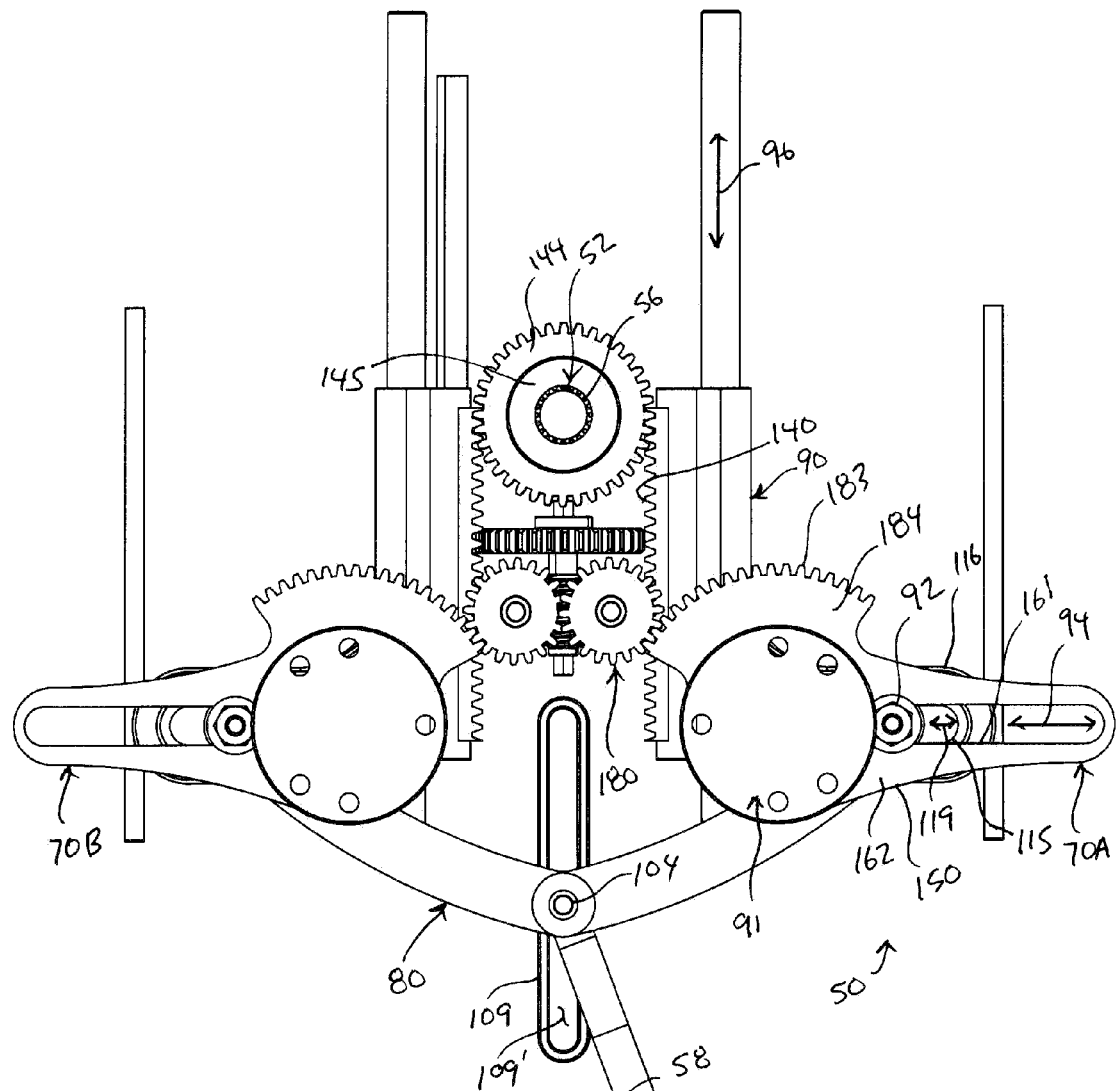
Figure 15:
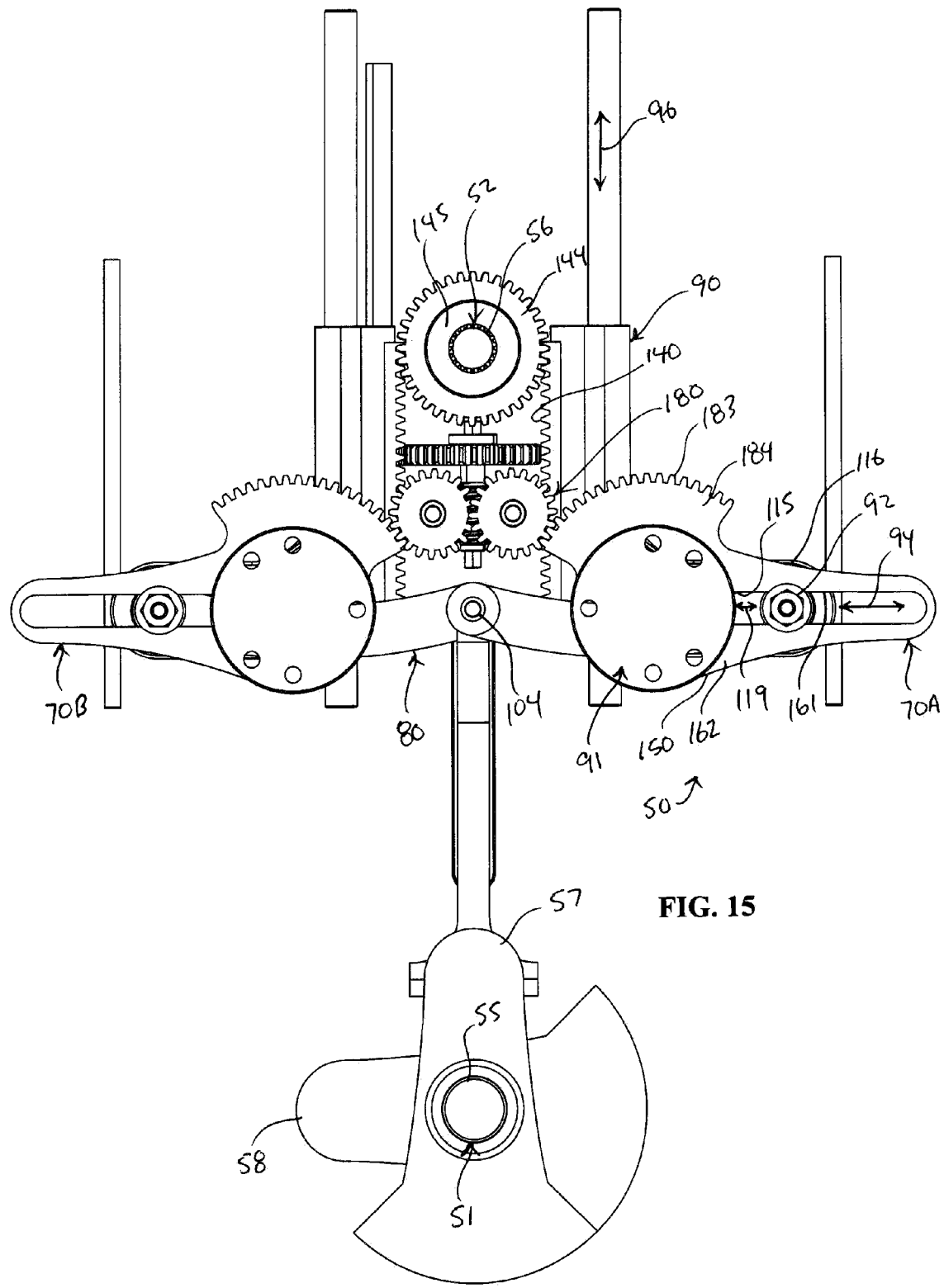

FIGS. 13-21 show a sequence of operation of transmission 70A of transmission apparatus 50. FIGS. 13-15 illustrate persuader 150 in the idle position locating persuader stroke path 94 in the inoperative direction of persuader stroke path 94 relative to drive path 96 of shuttle 90. In the inoperative direction of persuader stroke path 94, persuader arm 162 is parallel with respect to shuttle arm 116 and perpendicular with respect to drive path 96, persuader race 161 is parallel with respect to shuttle race 115 and perpendicular with respect to drive path 96, and persuader stroke path 94 is transverse relative to drive path 96 and parallel with respect to shuttle stroke path 119. In response to rotation of crank shaft 55 in this idle position of persuader 150 as shown in FIGS. 13-15, lug 92 (lug 92 not shown in FIG. 13 as lug 92 is concealed under head 160 of persuader 150) thus reciprocates freely in races 161 and 115 along stroke paths 94 and 119 of persuader 150 and shuttle 90, respectively, isolating shuttle 90 from the forcible reciprocation of lug 92, namely, preventing lug 92 from transferring its forcible reciprocation to shuttle 90. And so in the idle position of persuader 150, output shaft 56 is isolated from crankshaft 55. The inoperative direction of the persuader stroke path 94 is a perpendicular direction of persuader stroke path 94 relative to drive path 96 of shuttle 90, which is an embodiment of a transverse direction of persuader stroke path 94 relative to drive path 96. Lug 92 is not depicted in FIG. 13, but FIG. 13 illustrative of lug 92 at an inner position of reciprocation. FIG. 16 shows lug 92 reciprocated to an outer position of its lug stroke path along persuader stroke path 94, and FIG. 15 shows lug 92 reciprocated to an intermediate position between its outer and inner positions.

FIGS. 19-21 illustrate persuader 150 in the drive position locating persuader stroke path 94 in the operative direction of persuader stroke path 94 relative to drive path 96 of shuttle 90. In the operative direction of persuader stroke path 94, persuader arm 162 is perpendicular with respect to shuttle arm 116 and parallel with respect to drive path 96, persuader race 161 is perpendicular with respect to shuttle race 115 and parallel with respect to drive path 96, persuader stroke path 94 is parallel relative to drive path 96 and perpendicular with respect to shuttle stroke path 119, and lug 92 is fully reciprocated to or otherwise reciprocally coupled to shuttle 90. In response to rotation of crank shaft 55 in this drive position of persuader 150 as shown in FIGS. 19-21, lug 92 (lug 92 not shown in FIG. 19 as lug 92 is concealed under head 160 of persuader 150) thus reciprocates freely in race 161 along persuader stroke path 94 of persuader 150, and reciprocally acts against race 115 of shuttle arm 116 in opposite directions normal relative to race 115, whereby the forcible reciprocation of lug 92 is applied directly against shuttle 90 and is transferred directly to shuttle 90 reciprocating shuttle 90 along drive path 96 along its full length or distance of reciprocation driving output shaft 56 for rotation. And so in the drive position of persuader 150, output shaft 56 is coupled to crankshaft 55, and power in the form of rotation is transferred from crankshaft 55 output shaft 56. Lug 92 is not depicted in FIG. 16, but FIG. 16 illustrative of lug 92 at an inner position of reciprocation. FIG. 18 shows lug 92 reciprocated to an outer position of its lug stroke path along persuader stroke path 94 defining outermost position of shuttle 90, and FIG. 17 shows lug 92 reciprocated to an intermediate position between its outer and inner positions.

Persuader 150 rotates between idle and drive positions to change the direction of persuader stroke path 94 between the inoperative position thereof as shown FIGS. 13-15 and the operative position thereof as shown in FIGS. 19-21 to transfer power from crankshaft 55 to output shaft 56. FIGS. 16-18 illustrate persuader 150 in an intermediate drive position between the idle and drive positions locating persuader stroke path 94 in an intermediate operative direction of persuader stroke path 94 relative to drive path 96 of shuttle 90 and shuttle stroke path 119 of shuttle 90 between the inoperative and operative directions of persuader stroke path 94. In this intermediate operative direction of persuader stroke path 94, persuader arm 162 is angularly disposed with respect to shuttle arm 116 and drive path 96, persuader race 161 is angularly disposed with respect to shuttle race 115 and drive path 96, and persuader stroke path 94 is angularly disposed relative to drive path 96 and shuttle stroke path 119. In response to rotation of crank shaft 55 in this intermediate drive position of persuader 150 as shown in FIGS. 16-18, lug 92 (lug 92 not shown in FIG. 19 as lug 92 is concealed under head 160 of persuader 150) thus reciprocates freely in race 161 along persuader stroke path 94 of persuader 150. The linear reciprocating stroke length or stroke distance of lug 92 relative to drive path 96 is less than its maximum reciprocating stroke length or stroke distance in the operative direction of persuader stroke path 94 in the drive position of persuader 150. As such, lug 92 reciprocates partially along race 115 of shuttle arm 116 along a portion of shuttle stroke path 119, and partially reciprocally acts against race 115 of shuttle arm 116 in opposite directions off normal relative to race 115 partially reciprocating shuttle 90 along drive path 96, namely, reciprocating shuttle 90 along drive path 96 at reciprocating stroke length or stroke distance less than the maximum reciprocating stroke length or distance of shuttle 90 in the operative direction of persuader stroke path 94 in the drive position of persuader 150. The feature of lug 92 partially reciprocally acting against race 115 of shuttle arm in opposite directions off normal relative to race in an intermediate operative direction of persuader stroke path 94 between the inoperative direction of persuader stroke path 94 in the idle position of persuader 150 and the operative direction of persuader stroke path 94 in the drive position of persuader 150 means that lug 92 reciprocally acts against shuttle 90 more than in the inoperative direction of persuader stroke path 94 and less than in the operative direction of persuader stroke path 94 thus imparting a lesser degree, length, or distance of reciprocation relative to drive position of persuader 150 thus transferring a fraction of the rotational power and torque from crankshaft 55 to output shaft 56. In the moving of persuader 150 from its idle position to its drive position to move persuader stroke path 94 between its inoperative direction and its operative direction, the degree, length, or distance of reciprocation of shuttle 90 along drive path 96 infinitely increases from the idle position of persuader 150 to the drive position of persuader 150 and power from input 51 formed by crankshaft 55 is, therefore, transferred to output 52 formed by output shaft 56 along an infinitely variable torque and gearing ratio or range through the transfer of the forcible reciprocation of lug 92 to shuttle 90 between the inoperative and operative directions of persuader stroke path 94 of lug 92 relative to drive path 96 of shuttle 90 as illustrated in FIGS. 16, 17, and 18.

And so at a direction of persuader stroke path 94 between the inoperative and operative directions of persuader stroke path 94 of lug 92 as shown in FIGS. 16, 17, and 18, persuader stroke path 94 is angularly disposed relative to drive path 96 between the inoperative and operative directions of persuader stroke path 94 and lug 92 reciprocates along this angled persuader stroke path 94 relative to persuader assembly 91, reciprocates along persuader stroke path 94 partially relative to shuttle 90, and partially reciprocally acts against shuttle 90 in a direction parallel with respect to drive path 96 partially reciprocating shuttle 90 along drive path 96. Accordingly, the reciprocation of lug 92 along persuader stroke path 94 relative to shuttle 90 infinitely decreases from between the inoperative and operative directions of persuader stroke path 94, and infinitely increases from between the operative and inoperative directions of persuader stroke path 94. The reciprocation of shuttle 90 along drive path 96 in response to the reciprocal action of lug 92 against shuttle 90 infinitely increases from between the inoperative and operative directions of persuader stroke path 94, and infinitely decreases from between the operative and inoperative directions of persuader stroke path 94. As a result, crankshaft 55 can be made to rotate at a constant suitable speed, whereby power is transferred from crankshaft 55 to output shaft 56 across an infinitely variable torque and gearing ratio or range simply be moving persuader 150 between the idle and drive positions, according to the principle of the invention.

As shown in FIGS. 2-4, output shaft 56 is formed with a plurality of clutched gears 41, which each relate to one of transmissions 70A, 70B, 71A, and 71B. Linkage assembly 80 couples crank 57 to opposed transmissions 70A and 71A, which each relate to a clutched gear 141 of output shaft 56, and linkage assembly 81 couples crank 58 to opposed transmissions 70B and 71B, which each relate to a clutched gear 141 of output shaft 56. Because cranks 57 and 58 are offset, transmissions 70A, 70B, 71A, and 71B cooperate together to impart constant power transfer from crankshaft 55 to output shaft 56, whereby the reciprocation of the shuttles 90 of transmissions 70A and 71A is offset relative to the reciprocation of shuttles 90 of transmissions 70B and 71B. This produces constant power transfer from crankshaft 55 to output shaft 56.

The present invention is described above with reference to preferred embodiments. However, those skilled in the art will recognize that changes and modifications may be made in the described embodiments without departing from the nature and scope of the present invention. For instance, persuader assembly 91 has a plurality of persuaders, namely, persuader 150 and persuader 151. Transmission 70A can work equally well with just one persuader 150. Furthermore, it is to be understood that persuaders 150 and 151 of persuader assembly 91 cooperate as a persuader, in accordance with the principle of the invention. This applies to transmissions 70B, 71A, and 71B as well. Furthermore, crankshaft 55 has two cranks 57 and 58 that correspond with four opposed transmissions 70A, 70B, 71A, and 71B, and any number of such elements may be utilized in a transmission apparatus constructed and arranged in accordance with the principle of the invention.

Various further changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:
1. A transmission, comprising:
an input coupled to impart forcible reciprocation of a lug along a stroke path, the lug coupled between a shuttle and a persuader;
the shuttle coupled to drive an output in response to reciprocation of the shuttle along a drive path;
the persuader coupled between the lug and the shuttle to change the stroke path of the lug relative to the drive path of the shuttle from an inoperative direction relative to the drive path isolating the shuttle from the forcible reciprocation of the lug to an operative direction relative to the drive path transferring the forcible reciprocation of the lug along the stroke path to the shuttle imparting reciprocation to the shuttle along the drive path, whereby power from the input is transferred to the output along an infinitely variable torque and gearing range through the transfer of the forcible reciprocation of the lug to the shuttle between the inoperative and operative directions of the stroke path of the lug relative to the drive path of the shuttle;
wherein the inoperative direction of the stroke path is a transverse direction of the stroke path relative to the drive path of the shuttle, and the operative direction of the stroke path is a parallel direction of the stroke path relative to the drive path of the shuttle;
wherein the shuttle is operatively coupled to the driven shaft to drive the driven shaft for rotation with a rack coupled to the shuttle geared to a clutched gear coupled to the driven shaft;
the persuader is mounted for rotation between first and second positions to change the stroke path of the lug between the inoperative and operative directions, respectively;
a persuader shaft mounted for rotation; and
the persuader shaft operatively coupled to the persuader to rotate the persuader between the first and second positions in response to rotation of the persuader shaft.

2. The transmission according to claim 1, further comprising in the inoperative direction of the stroke path, the lug reciprocates along the stroke path relative to the shuttle and the persuader.

3. The transmission according to claim 2, further comprising in the operative direction of the stroke path, the lug reciprocates along the stroke path relative to the persuader and reciprocally acts against the shuttle reciprocating the shuttle along the drive path.

4. The transmission according to claim 3, wherein between the inoperative and operative directions of the stroke path of the lug, the lug reciprocates along the stroke path relative to the persuader, reciprocates along the stroke path partially relative to the shuttle, and partially reciprocally acts against the shuttle partially reciprocating the shuttle along the drive path.

5. The transmission according to claim 4, further comprising:
the reciprocation of the lug along the stroke path relative to the shuttle infinitely decreases from the inoperative direction of the stroke path to the operative direction of the stroke path, and infinitely increases from the operative direction of the stoke path to the inoperative direction of the stroke path; and
the reciprocation of the shuttle along the drive path in response to the reciprocal action of the lug against the shuttle infinitely increases from the inoperative direction of the stroke path to the operative direction of the stroke path, and infinitely decreases from the operative direction of the stroke path to the inoperative direction of the stroke path.

6. The transmission according to claim 1, further comprising:
the input is a crank shaft having a crank throw; and
a linkage assembly operatively coupling the crank throw of the crank shaft to the lug imparting the forcible reciprocation of the lug along the stroke path in response to rotation of the crank shaft.

7. The transmission according to claim 6, further comprising:
the output is a driven shaft; and
the shuttle is operatively coupled to the driven shaft to drive the driven shaft for rotation in only one direction in response to reciprocation of the shuttle along the drive path.

8. The transmission according to claim 1, wherein the persuader shaft is operatively coupled to the persuader with gearing formed between the persuader shaft and the persuader.

9. The transmission according to claim 8, wherein the gearing comprises a pinion gear carried by the persuader shaft, and a partial gear carried by the persuader.

10. A transmission, comprising:
a shuttle formed with a shuttle race and coupled to drive an output in response to reciprocation of the shuttle along a drive path, the shuttle race being transverse relative to the drive path;
a persuader formed with a persuader race defining a stroke path;
a lug extends concurrently into and is reciprocated to the shuttle and persuader races, and an input coupled to impart forcible reciprocation of the lug along the stroke path of the persuader race;
the persuader movable to change the stroke path of the persuader race relative to the drive path of the shuttle from an inoperative direction relative to the drive path isolating the shuttle race from the forcible reciprocation of the lug along the stroke path an operative direction relative to the drive path transferring the forcible reciprocation of the lug along the stroke path to the shuttle race imparting reciprocation to the shuttle along the drive path, whereby power from the input is transferred to the output along an infinitely variable torque and gearing range through the transfer of the forcible reciprocation of the lug along the stroke path of the persuader race to the shuttle at the shuttle race between the inoperative and operative directions of the stroke path of the persuader race relative to the drive path of the shuttle; wherein
in the inoperative direction of the stroke path the lug reciprocates along the stroke path relative to the shuttle race and the persuader race;
in the operative direction of the stroke path the lug reciprocates along the stroke path relative to the persuader race and reciprocally acts against the shuttle reciprocating the shuttle along the drive path;
between the inoperative and operative directions of the stroke path the lug reciprocates along the stroke path relative to the persuader, reciprocates along the stroke path partially relative to the shuttle, and partially reciprocally acts against the shuttle partially reciprocating the shuttle along the drive path;
the reciprocation of the lug along the stroke path relative to the shuttle infinitely decreases from the inoperative direction of the stroke path to the operative direction of the stroke path, and infinitely increases from the operative direction of the stoke path to the inoperative direction of the stroke path; and
the reciprocation of the shuttle along the drive path in response to the reciprocal action of the lug against the shuttle race infinitely increases from the inoperative direction of the stroke path to the operative direction of the stroke path, and infinitely decreases from the operative direction of the stroke path to the inoperative direction of the stroke path.

11. The transmission according to claim 10, wherein the inoperative direction of the stroke path is a transverse direction of the stroke path relative to the drive path of the shuttle.

12. The transmission according to claim 11, wherein the operative direction of the stroke path is a parallel direction of the stroke path relative to the drive path of the shuttle.

13. The transmission according to claim 10, further comprising:
the input is a crank shaft having a crank throw; and
a linkage assembly operatively coupling the crank throw of the crank shaft to the lug imparting the forcible reciprocation of the lug along the stroke path in response to rotation of the crank shaft.

14. The transmission according to claim 13, further comprising:
the output is a driven shaft; and
the shuttle is operatively coupled to the driven shaft to drive the driven shaft for rotation in only one direction in response to reciprocation of the shuttle along the drive path.

15. The transmission according to claim 14, wherein the shuttle is operatively coupled to the driven shaft to drive the driven shaft for rotation with a rack coupled to the shuttle geared to a clutched gear coupled to the driven shaft.

16. The transmission according to claim 10, wherein the persuader is mounted for rotation between first and second positions to change the stroke path between the inoperative and operative directions, respectively.

17. The transmission according to claim 16, further comprising:
a persuader shaft mounted for rotation; and
the persuader shaft operatively coupled to the persuader to rotate the persuader between the first and second positions in response to rotation of the persuader shaft.

18. The transmission according to claim 17, wherein the persuader shaft is operatively coupled to the persuader with gearing formed between the persuader shaft and the persuader.

19. The transmission according to claim 18, wherein the gearing comprises a pinion gear carried by the persuader shaft, and a partial gear carried by the persuader.

\* \* \* \* \*